(12) United States Patent
McVeigh et al.

(10) Patent No.: US 6,760,465 B2
(45) Date of Patent: Jul. 6, 2004

(54) MECHANISM FOR TRACKING COLORED OBJECTS IN A VIDEO SEQUENCE

(75) Inventors: Jeffrey S McVeigh, Portland, OR (US); Matthew E Frazer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 09/822,086

(22) Filed: Mar. 30, 2001

(65) Prior Publication Data

US 2002/0141615 A1 Oct. 3, 2002

(51) Int. Cl.[7] .............................................. G06K 9/00
(52) U.S. Cl. ...................................................... 382/103
(58) Field of Search ................................. 382/103, 169, 382/172; 348/169, 172, 208.14; 725/12

(56) References Cited

U.S. PATENT DOCUMENTS

| | | | |
|---|---|---|---|
| 5,016,173 A | 5/1991 | Kenet et al. ............... 382/128 |
| 5,265,173 A | * 11/1993 | Griffin et al. .............. 382/103 |
| 5,459,793 A | * 10/1995 | Naoi et al. ................. 382/165 |
| 5,644,386 A | * 7/1997 | Jenkins et al. ............. 356/4.01 |
| 5,649,021 A | 7/1997 | Matey et al. ............... 382/128 |
| 5,659,490 A | 8/1997 | Imamura .................... 358/500 |
| 5,751,450 A | 5/1998 | Robinson ................... 358/504 |
| 5,912,980 A | * 6/1999 | Hunke ....................... 382/103 |
| 5,961,571 A | 10/1999 | Gorr et al. ................. 701/207 |
| 6,014,167 A | 1/2000 | Suito et al. ................. 348/169 |
| 6,075,557 A | 6/2000 | Holliman et al. ........... 348/51 |
| 6,118,887 A | 9/2000 | Cosatto et al. ............. 382/103 |
| 6,148,092 A | * 11/2000 | Qian ........................... 382/118 |
| 6,181,817 B1 | 1/2001 | Zabih et al. ................ 382/170 |
| 6,188,777 B1 | 2/2001 | Darrell et al. .............. 382/103 |
| 6,215,893 B1 | 4/2001 | Leshem et al. ............ 382/128 |
| 6,292,575 B1 | 9/2001 | Bortolussi et al. ......... 382/118 |
| 6,332,033 B1 | * 12/2001 | Qian ........................... 382/124 |
| 6,363,160 B1 | 3/2002 | Bradski et al. ............. 382/103 |
| 6,389,155 B2 | 5/2002 | Funayama et al. ......... 382/118 |
| 6,394,557 B2 | 5/2002 | Bradski ...................... 382/103 |
| 6,404,900 B1 | * 6/2002 | Qian et al. ................. 382/103 |
| 6,419,638 B1 | 7/2002 | Hay et al. .................. 600/558 |
| 6,445,810 B2 | 9/2002 | Darrell et al. ............. 382/115 |
| 6,483,445 B1 | 11/2002 | England ..................... 341/22 |
| 6,556,708 B1 | * 4/2003 | Christian et al. .......... 382/165 |
| 2001/0042081 A1 | 11/2001 | MacFarlane et al. ....... 715/513 |

* cited by examiner

*Primary Examiner*—Andrew W. Johns
*Assistant Examiner*—Shervin Nakhjavan
(74) *Attorney, Agent, or Firm*—Pillsbury WInthrop LLP

(57) ABSTRACT

An automated object tracking system for tracking a colored object through a series of frames of data. The system has a first image source device to provide a data array of pixels of a digital image. A second image source device provides a binary image of the data array. The system utilizes an analysis system to create a first histogram for columns of the binary image and a second histogram for rows of the binary image. Each histogram is thresholded, and after being thresholding, is utilized to estimate the center of a tracked object in the binary image.

24 Claims, 28 Drawing Sheets

MECHANISM FOR TRACKING COLORED OBJECTS IN A VIDEO SEQUENCE

BACKGROUND OF THE INVENTION

1. Field of the Invention

This invention relates generally to the field of computer vision, and more specifically to a system, method and apparatus for detecting and tracking a selected object in a video sequence.

2. Discussion of the Related Art

Computer vision systems are known in the art. Such systems may track objects through a series of digital frames. However, many of the presently utilized systems track images only in the red-green-blue ("RGB") colorspace. Such systems are poor at tracking objects through frames in which lighting conditions are changing.

Digital images include at least one picture element ("pixel"). Pixels are the small discrete elements that together constitute digital images. Each pixel of a digital image may be displayed on a computer monitor, or the like. Each pixel may be classified according to the amount of each of the primary colors of visible light—red, green and blue—(the "RGB colorspace") that are present in the pixel. If 8 bits of information are used to represent the amount of light for each of the primary colors for each pixel, then with respect to the red component of an RGB image, the brightest red would be represented by the number 255 (in binary, 11111111) and a complete absence of red would be represented by the number 0 (in binary, 00000000). The amounts of green and blue in the pixel are also represented in a similar way.

However, the amounts of red, green and blue in an image represented in the RGB colorspace may change in different lighting conditions. For example, in a digital photograph of a red sweater, the red component of the RGB colorspace might have a level of "110" in medium lighting, "200" in bright lighting conditions, and "40" in dim lighting, even though the sweater has not been altered—only the lighting has changed. Therefore, since each of the RGB components are influenced by lighting conditions, it is problematic to keep track of a colored object in the RGB colorspace.

Another colorspace is the Hue-Saturation-Value (HSV) colorspace. The HSV colorspace, in constrast to the RGB colorspace, better represents what humans see. In the HSV colorspace, each pixel may be classified according to its Hue, the Saturation of its Hue, and the brightness (Value) in a pixel. Hue represents the wavelength of light present in the pixel. In the HSV colorspace, each of the visible colors of light is represented. Each pixel of an image has a Hue represented by cylindrical coordinates between 0° and 359°. Red is represented by coordinates around 0°. Yellow is represented by coordinates around 60°. Blue is represented by coordinates around 240°. Green is represented by coordinates around 300°.

Saturation represents the amount of Hue present in a pixel. If Saturation is represented on a scale between 0 and 1, a Saturation of 0.5 for a red Hue would be a medium red. A "very red" pixel would be represented by a Saturation of close to 1. A very red pixel would have so much red that it would, in fact, appear to be glowing red. A pixel with a red Hue that is not very red would be represented by a Saturation close to 0. Hues with Saturations close to zero appear to be mostly gray with only a slight amount of that Hue present.

Value is utilized to represent the amount brightness in the pixel. Value is typically represented on a scale from 0 to 1, with 1 representing the greatest amount of brightness, and 0 representing the least amount of brightness. Pixels with brightness near 0 are very dark—almost black. Pixels near 1 are very bright—almost white. If the Saturation is 0, then Value by itself represents the grayscale.

Object tracking systems in the art are deficient in that they are typically only able to accurately track objects under well-known conditions, such as within a range of illumination and with constraints on the fidelity of the camera.

Many current tracking systems convert a colored image into a binary image, the binary image being an image in which each pixel is represented by a "1" or "0". Each "1" represents a pixel that might be a part of the object to be tracked. Such systems utilize processes to find the largest connected-object within the binary image, the largest connected-object being determined to be the tracked object. Such algorithms are very time-comsuming and generally inefficiently utilize system resources.

BRIEF DESCRIPTION OF THE DRAWINGS

FIG. 11 illustrates a binary image according to an embodiment of the present invention;

DETAILED DESCRIPTION

The preferred embodiment of the invention relates to a computer-vision application of tracking a colored object within a sequence of video frames. The preferred embodiment of the present invention is a system, method and apparatus for calibrating a statistical model used to classify pixels for the object to be tracked in the video frames. Once calibrated, the object may be tracked through a series of frames. In the preferred embodiment, the object is tracked through a series of frames represented by the Hue-Saturation-Value (HSV) colorspace.

Figure 1A:
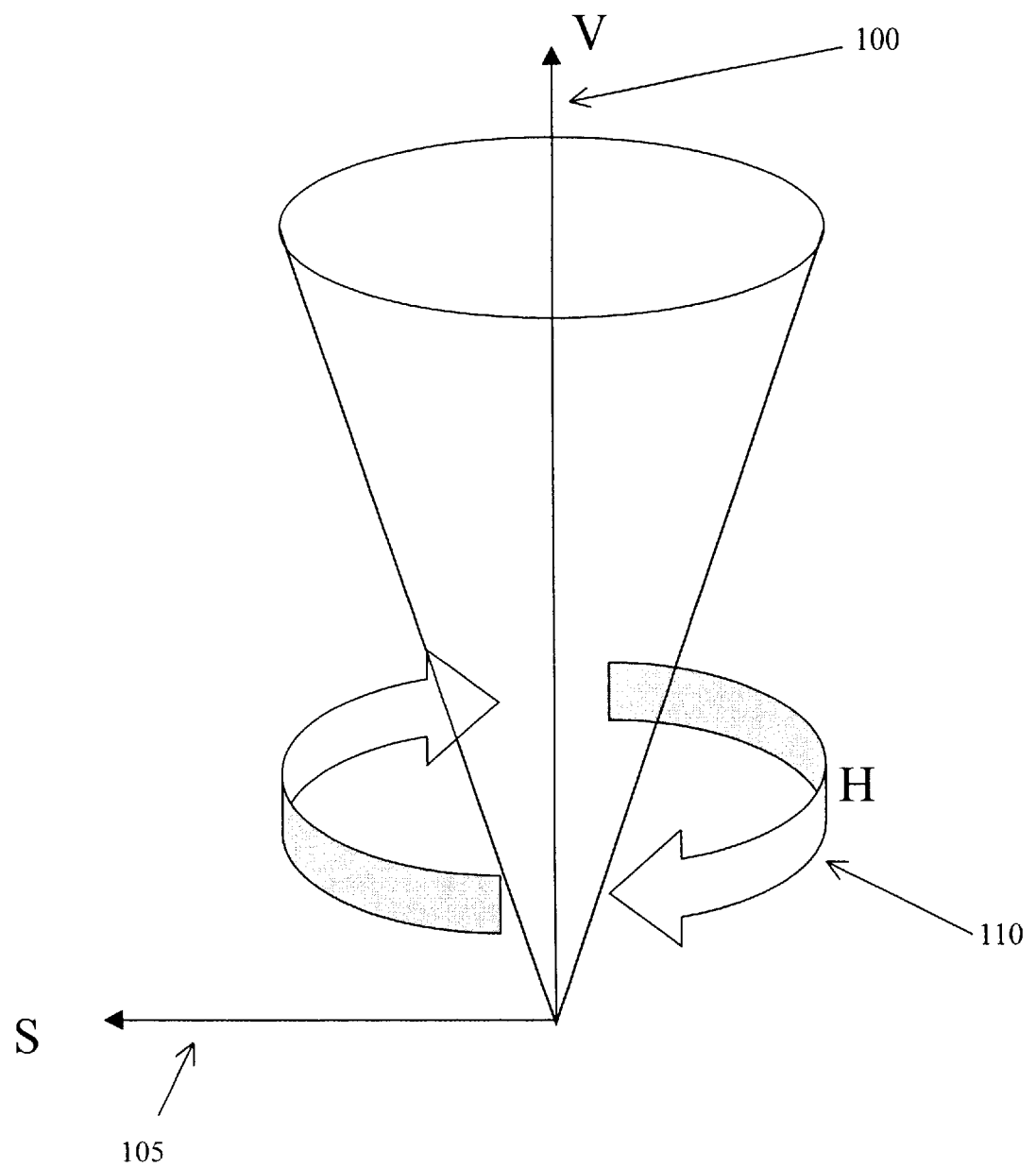
FIG. 1A illustrates an HSV colorspace according to an embodiment of the present invention.

FIG. 1A illustrates an HSV colorspace according to an embodiment of the present invention. The HSV colorspace, when illustrated in three dimensions, has the appearance of a cone. In FIG. 1A, the Value axis, V 100, extends in an upward direction from an origin point. The Saturation coordinate system, S 105, extends in an outward direction perpendicular to the Value coordinate 100. The cylindrical Hue coordinate, H 110, wraps around the V coordinate 100 in a clock-wise radial direction. At any Value level, the Saturation level is "1" at the side of the "cone" representing Hue, and "0" at the Value axis. Therefore, the linear distance between the V axis and the H coordinate system increases as the V coordinate increases.

Figure 1B:
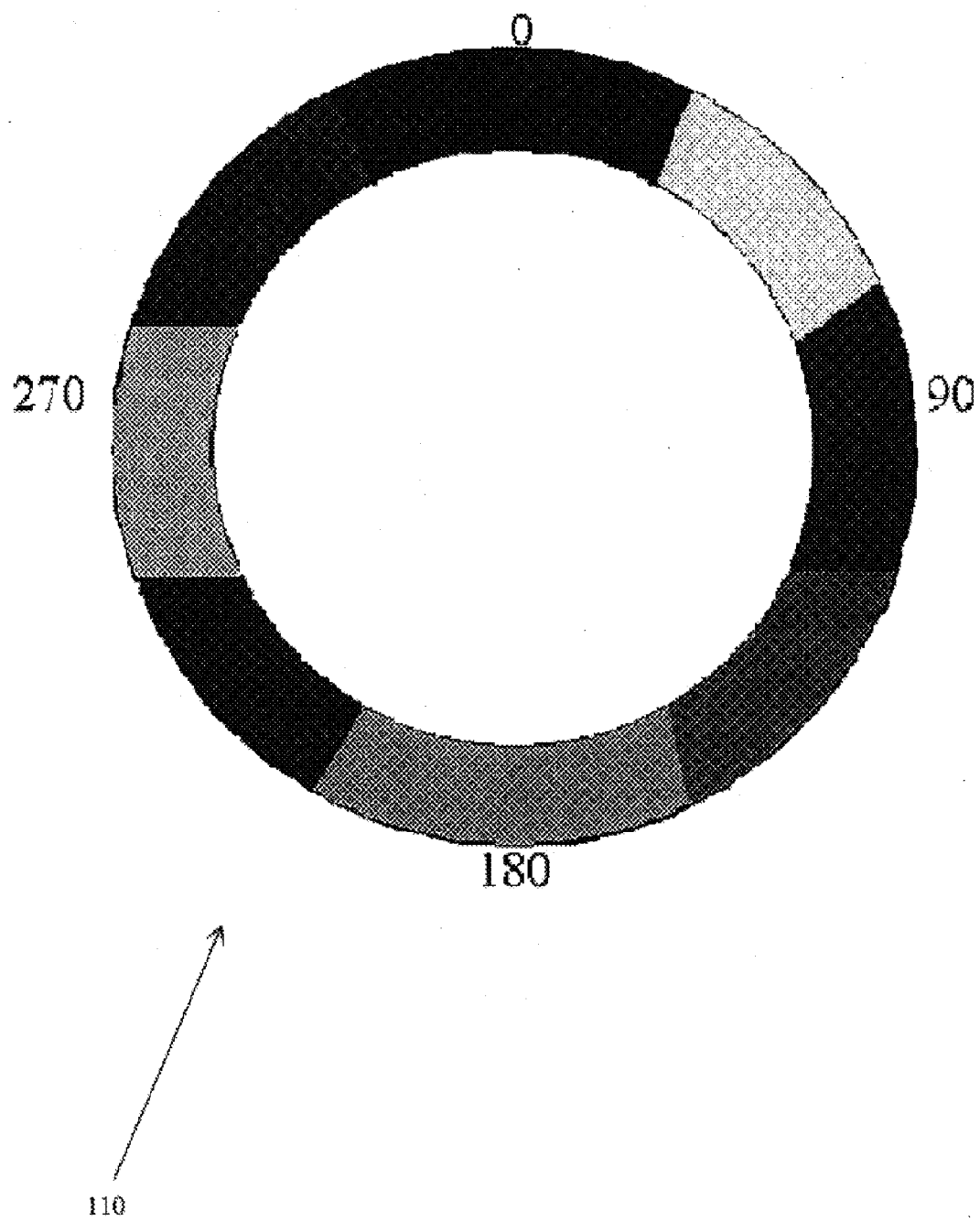
FIG. 1B illustrates a cylindrical H coordinate system according to an embodiment of the present invention.

FIG. 1B illustrates a circular H coordinate system 110 according to an embodiment of the present invention. The coordinates for this coordinate system range from 0° to just below 360°. All pixels may be represented in the HSV colorspace.

In the preferred embodiment, a user utilizes a system to select a colored object to be tracked in a series of digital frames. The system calibrates itself to track the object's movements through the frames.

Figure 2:
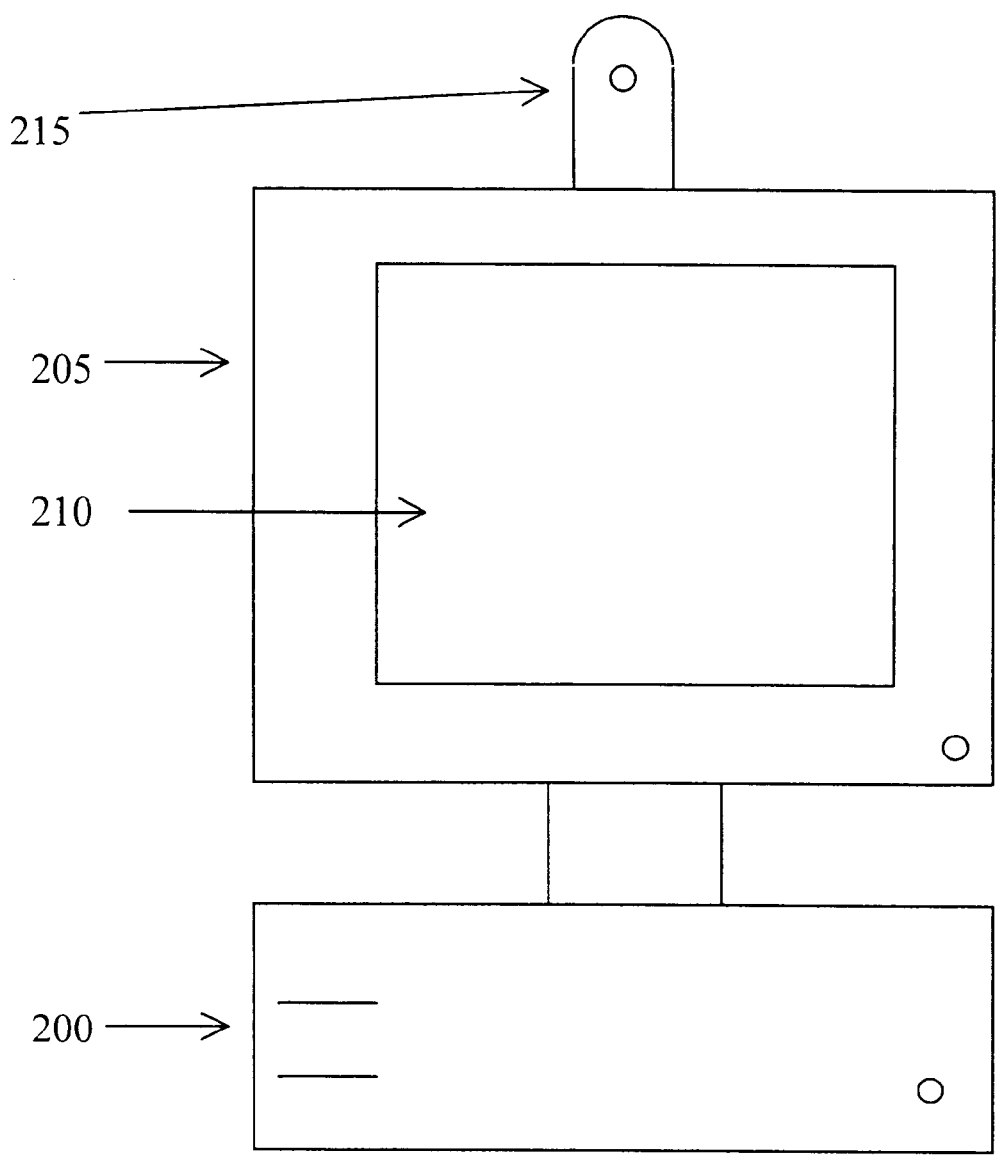
FIG. 2 illustrates a computer setup according to an embodiment of the present invention.

FIG. 2 illustrates a computer setup according to an embodiment of the present invention. In the computer setup, there is a computer 200 with a monitor 205. The monitor 205 has a display screen 210. The display screen 210 may be a liquid crystal display (LCD) or a cathode ray tube (CRT), for example. Attached to the computer 200 is a digital video camera (webcam) 215. The webcam 215 may be any digital camera connectable to the computer 200. In other embodiments, an analog camera could be utilized, and the computer 200 may digitize an output video stream from the analog camera. Additional embodiments may include input sources other than video cameras, such as streaming video, for example.

In FIG. 2, the webcam 215 is attached to the top of the computer 200. In an alternative embodiment, the webcam 215 may be a physical part of the monitor or may be physically separate from the monitor 205.

When digital images are sampled from the webcam 215, they are transformed into the RGB colorspace. The tracking program, however, operates in the HSV colorspace. Therefore, the RGB images must be converted into the HSV colorspace before the tracking and calibration processing begins. There are a number of algorithms for performing this conversion. Algorithms written in virtually any computer language may perform this function.

Figure 3:
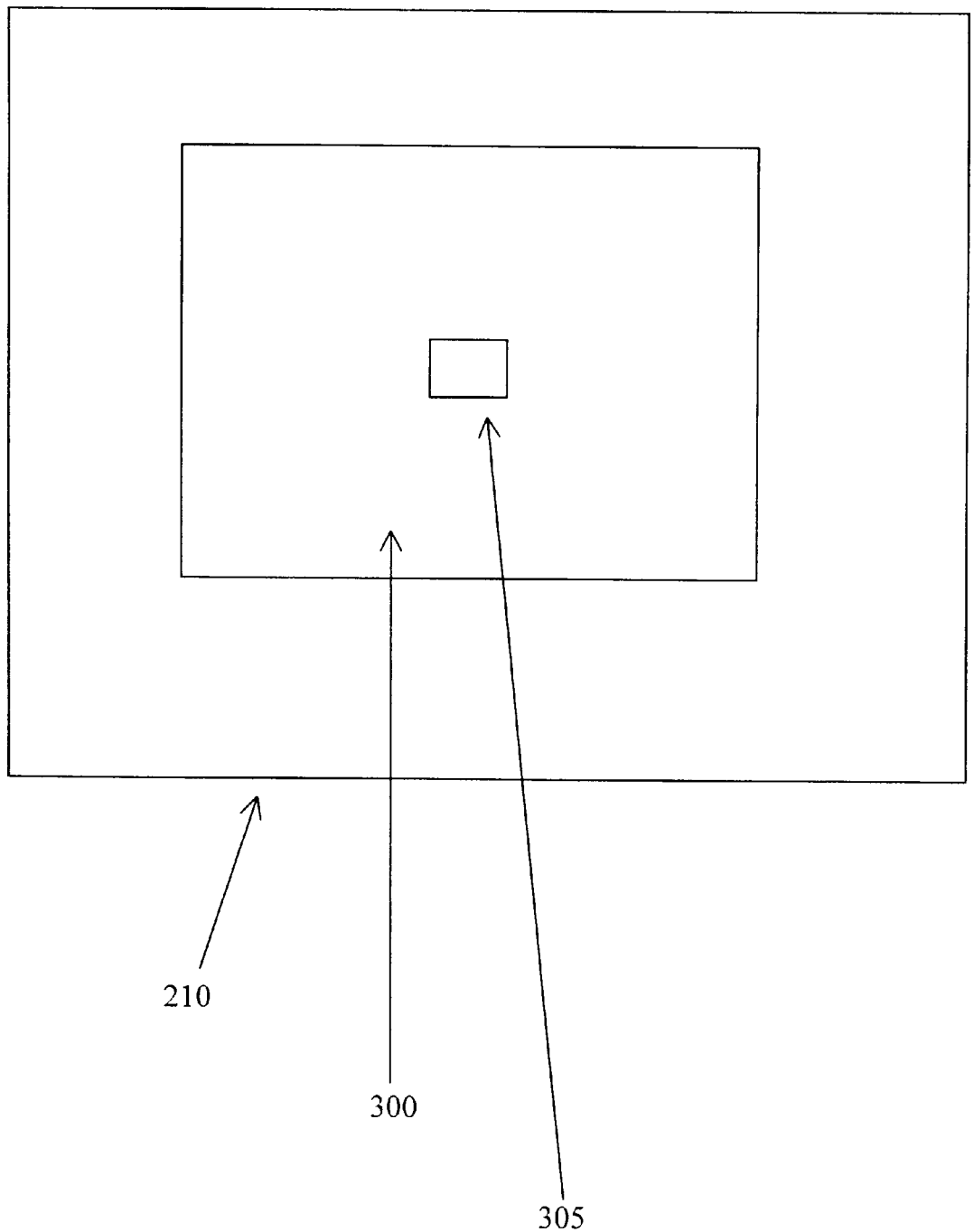
FIG. 3 illustrates a close-up view of the monitor display screen when a calibration program for a video capture program is executed by the computer according to an embodiment of the present invention.

FIG. 3 illustrates a close-up view of the monitor display screen 210 when a calibration program for a video capture program is executed by the computer 200 according to an embodiment of the present invention. The output from the video stream from the webcam 215 is displayed in a video display window 300 displayed on the monitor display screen 210. When a calibration program is executed by the computer 200, a calibration rectangle 305 is displayed in the center of the video display window 300. The calibration program is utilized to "lock-in", or set, the program to track any movement of a selected object's pixels through the video display window 300.

In the HSV colorspace, there is not much perceptible difference between pixels having different Hues, but similar Saturations and Values, when the Saturation is very low. A green pixel with low Saturation looks very similar to a red pixel of low Saturation with a similar, or same, Value. Pixels with low Saturation are known as "unstable pixels" because there is little perceptible difference between the Hues of the pixels. Pixels with very low Value are also unstable, regardless of the Saturation. Therefore, when calibrating and tracking pixels throughout the image display window 300, the unstable pixels are disregarded, due to their instability.

Figure 4A:
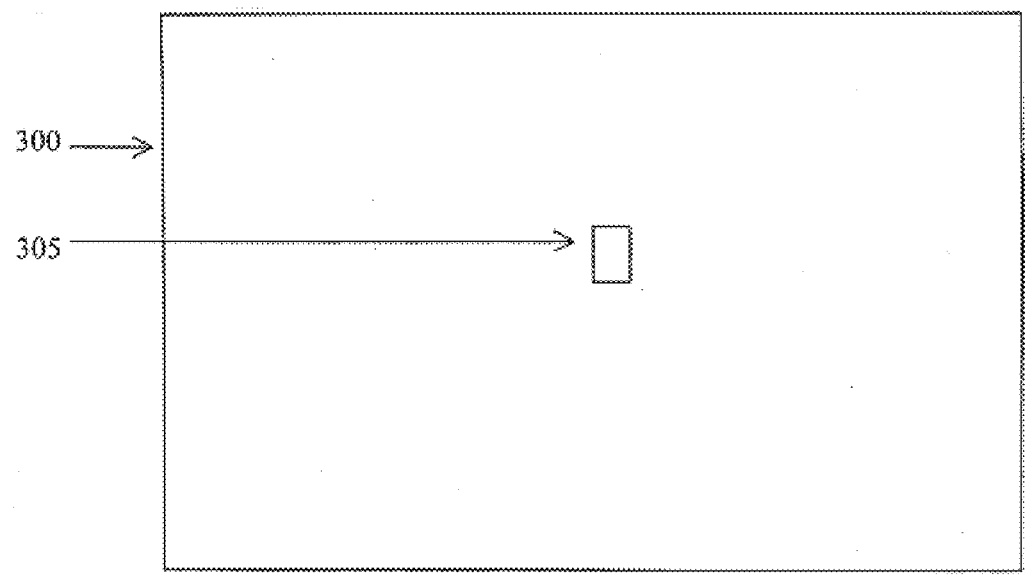
FIG. 4A illustrates a close-up view of the calibration rectangle within the video display window according to an embodiment of the present invention.

FIG. 4A illustrates a close-up view of the calibration rectangle 305 within the video display window 300 according to an embodiment of the present invention. In FIG. 4A, all of the pixels from the video input have the same or very similar Hues, Saturations and Values. Calibration may not occur in a video frame having pixels with uniform Hues, Saturations and Values, because it is impossible to differentiate between pixels representing an object to be tracked and the background.

Although the calibration rectangle 305 is shown substantially in the center of the video display window 300, the calibration rectangle 305 may be located anywhere within the video display window 300. In other embodiments, the calibration rectangle 305 can be moved to different locations of the video display window 300. In some embodiments, the user may move the calibration rectangle 305 by dragging it to an area of the video display window 300. In an embodiment where the video display window 300 is "160" pixels wide and "220" pixels tall ("160×120"), the calibration rectangle 305 may be "4" pixels wide and "6" pixels tall. The calibration rectangle 305 may also be other sizes and shapes, such as circular. In other embodiments, both the video display window 300 and the calibration rectangle 305 may also be different sizes. The video display window 300 may be larger in a computer 200 having a very large monitor 205 and/or a fast processor for sampling the digital images from the webcam 215 input. In the preferred embodiment, the sampling rate may be "30" frames/second. In other embodiments, the sampling rate may be higher or lower. A lower sampling rate is generally used in computers 200 having a relatively low processing power, because the lower the sampling rate, the greater the lag time between an object moving in front of the webcam 215 and its display in the video display window 300 on the monitor 205.

Figure 4B:
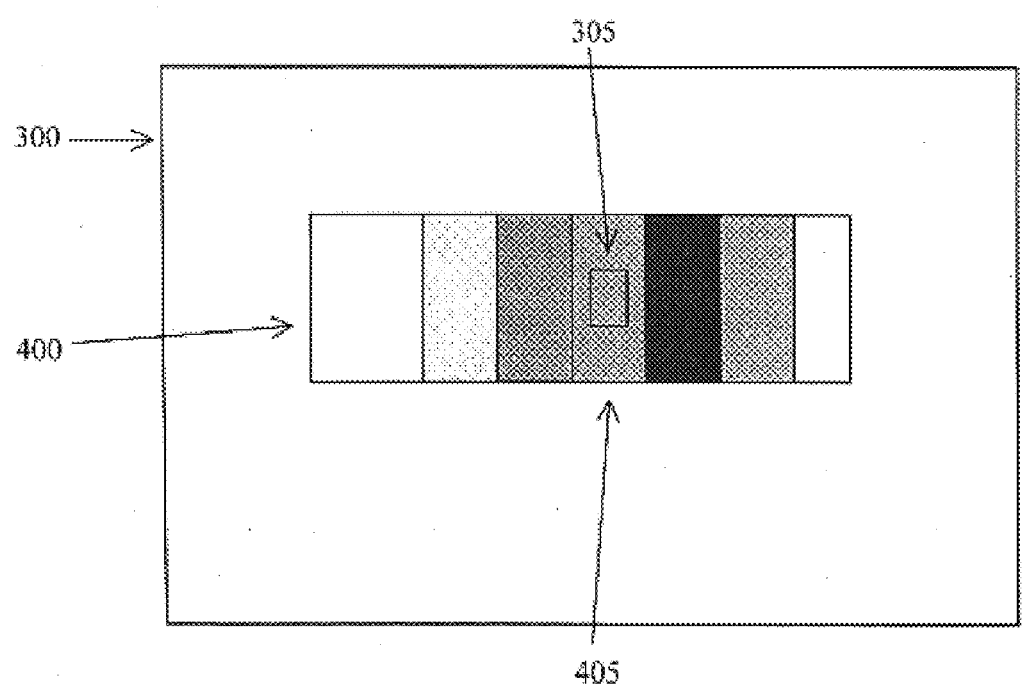
FIG. 4B illustrates a close-up view of a multi-colored object located within the video display window according to an embodiment of the present invention.

FIG. 4B illustrates a close-up view of a multi-colored object 400 located within the video display window 300 according to an embodiment of the present invention. The multi-colored object 400 has a plurality of colored stripes. A first colored stripe 405 is located within the calibration rectangle 305 and within the pixels surrounding it.

When a user of this system desires to track an object's movement through the video display window 300, the user must first perform calibration. During the calibration process, the pixels to be tracked are selected. In the example shown in FIG. 4B, "turquoise" pixels are located within the calibration rectangle 305. If the user wants to track the turquoise pixels, the user may prompt the system to calibrate the pixels for tracking.

Figure 5:
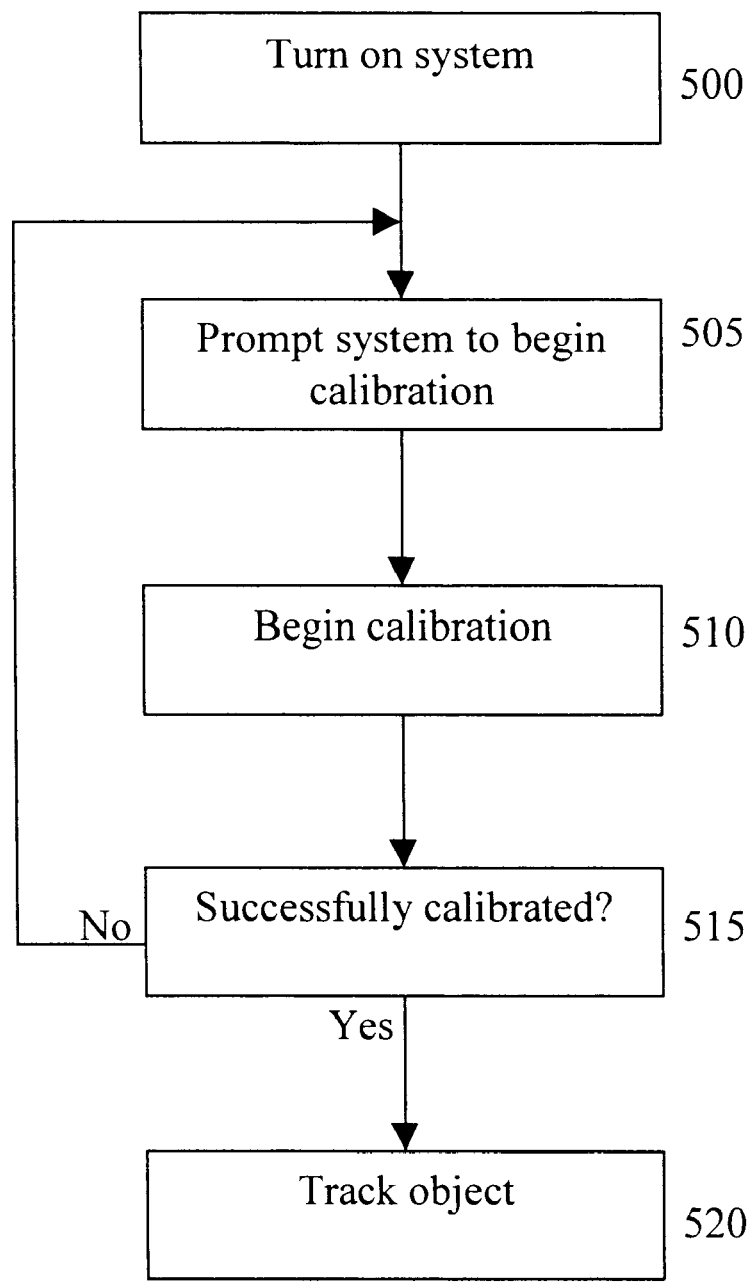
FIG. 5 illustrates a pre-object-tracking process according to an embodiment of the present invention.

FIG. 5 illustrates a pre-object-tracking process according to an embodiment of the present invention. First, the system is turned 500 on and the calibration program started. When the video display window 300 and the calibration rectangle 305 are displayed on the monitor 205, calibration may begin. Next, the user may prompt 505 the system to begin calibration. In the preferred embodiment, the user prompt the system to begin calibration by clicking on a box within a graphical user interface at the user's computer 200. In other embodiments, a video camera source may have a button which may be pressed to begin calibration, or a signal, such as lights being turned on in a dark room, could be the prompt to begin calibration. A calibration process then begins 510 (the calibration process is discussed below). After calibration, the system determines 515 whether there has been a successful calibration. If there has been a successful calibration, the object is tracked 520. If there has not been a successful calibration, the pre-object-tracking process may be attempted again. In some embodiments, the user may be given an error message when the calibration is unsuccessful. In other embodiments, the calibration process may automatically restart. If the process is restarted, the user must again move 505 the object to be tracked into the calibration rectangle 305.

In the preferred embodiment, the calibration rectangle 305 remains in a constant location in the video display window 300. Thus, in order to calibrate the system to track a particular object, the user must situate the object in a location in front of the webcam 215 so that the pixels represent the object are displayed within the calibration box 305 in the video display window 300. The data sampled from the webcam 215, or acquired from another input source, is utilized to select the object. The video display window 300 therefore simply show displays the output of the system.

Figure 6A:
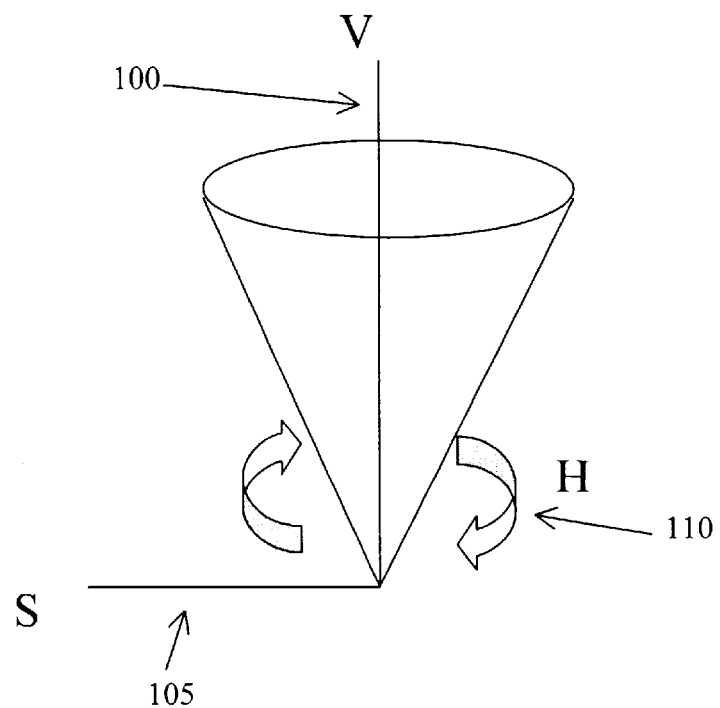
FIG. 6A illustrates an HSV colorspace of pixels in a sampled image, according to an embodiment of the present invention.

FIG. 6A illustrates an HSV colorspace of the pixels in a sampled image, according to an embodiment of the present invention. Pixels may be represented at any point within the colorspace. Since the pixels with very low Saturation and the pixels with very low Value are relatively unstable, these pixels are disregarded. To disregard unstable pixels, the unstable pixels may be "thresholded out of", or removed from, the colorspace. The pixels may be thresholded out based upon the levels of S 105 and V 100 present in the pixels. A function such as S*V=K, K being a predetermined constant, may be utilized as a thresholding function. In the function S*V=K, the S 105 and V 100 coordinates are multiplied together, and pixels having a product less than K are ignored. For example, if K=0.4, a pixel with an S of 0.9 and a V of 0.8 would be kept, since the product of its S 105 and V 100 coordinates is 0.9*0.8=0.72. However, a pixel having an S of 0.5 and a V of 0.4 would be thresholded out, because the product of its S 105 and V 100 coordinates is 0.5*0.4=0.2.

Figure 6B:
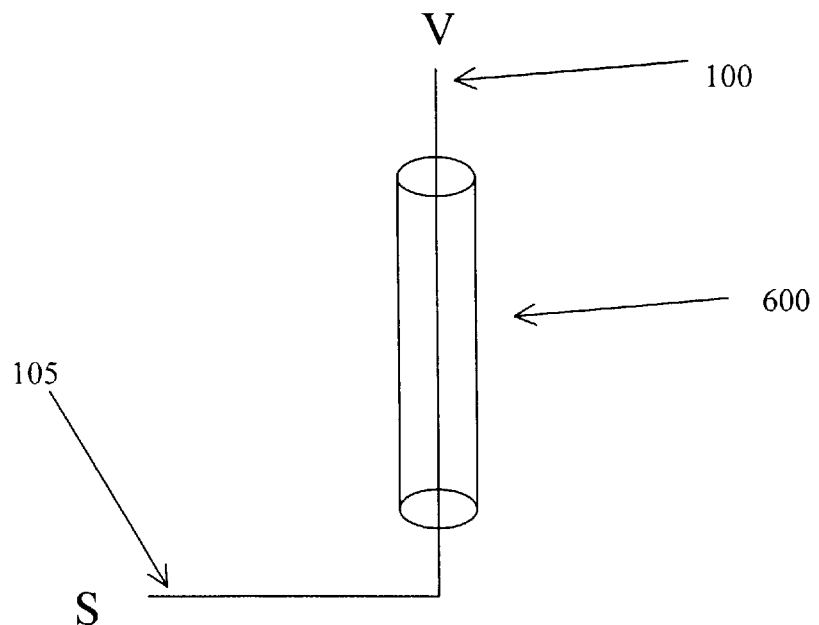
FIG. 6B illustrates a thresholding function according to an embodiment of the present invention.

FIG. 6B illustrates a thresholding function according to an embodiment of the present invention. The cylinder 600 is formed from the function S*V=K. The function wraps around the V axis 100. The shape of the function is a cylinder 600 because at any point along the V axis within the HSV cone, S is "0" at the V axis and "1" at the H axis. Therefore, a the top of the HSV colorspace cone shwon in FIG. 6A, the linear distance between points having the same Value and Hue, but a different Saturation, varies, depending upon the Value coordinate. So, if H is a constant amount and V is "1" (i.e., at the flat part on the top of the cone), the distance between the V axis and the H coordinate system is larger than it is when V is "0.5".

Figure 6C:
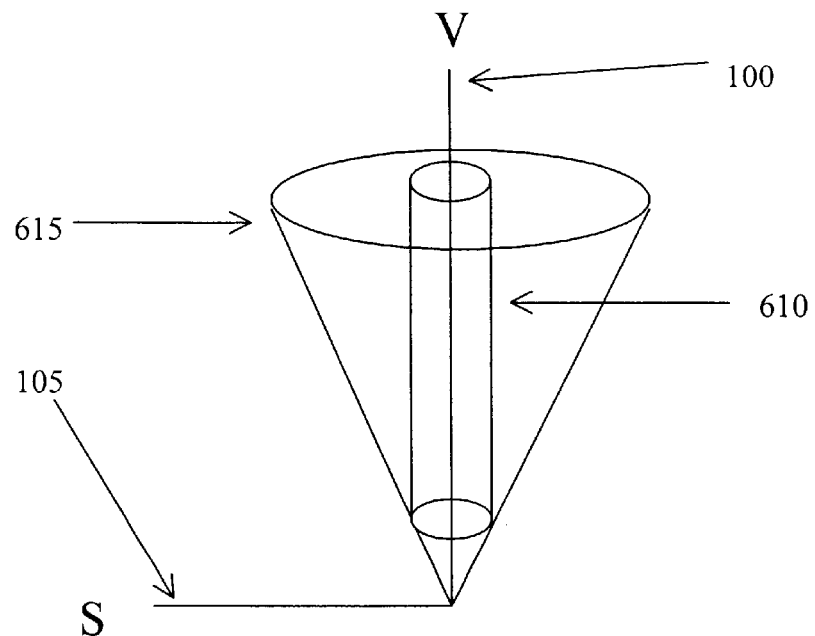
FIG. 6C illustrates a thresholding function superimposed on top of an HSV colorspace for an image according to an embodiment of the present invention.

FIG. 6C illustrates a thresholding function superimposed on top of the HSV colorspace for an image according to an embodiment of the present invention. All of the pixels between the lines 600 and 605 formed by the thresholding function and the V axis 100 are thresholded out, because they are unstable.

Figure 6D:
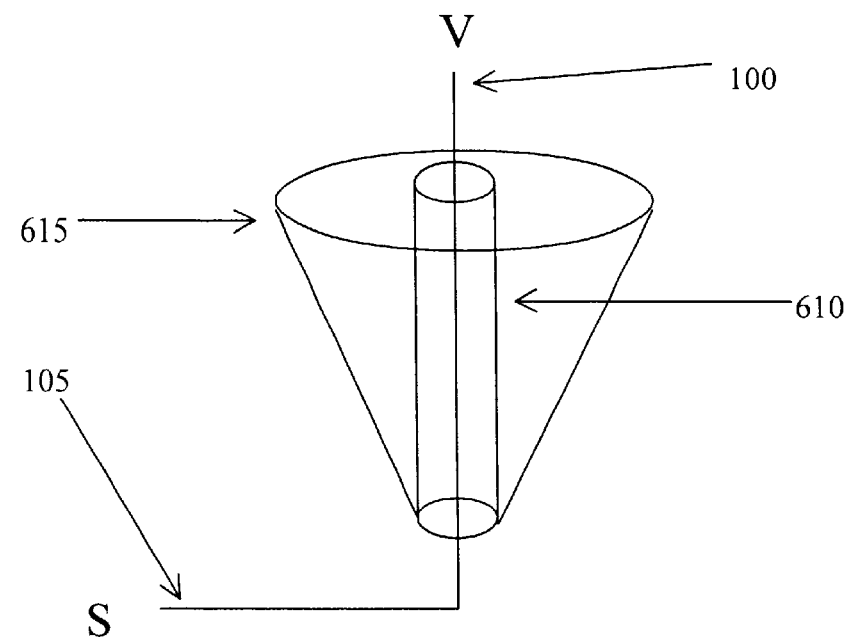
FIG. 6D illustrates an HSV colorspace after pixel data below a threshold level has been removed according to an embodiment of the present invention.

FIG. 6D illustrates an HSV colorspace after pixel data below a threshold level has been removed according to an embodiment of the present invention. The thresholded HSV colorspace has an inner boundary 610 and outer boundary 615. For illustrative purposes, only a portion of the HSV colorspace is shown in FIG. 6D. The entire HSV colorspace, after the application of the thresholding function, wraps around the V axis 100 in a radial direction.

Figure 6E:
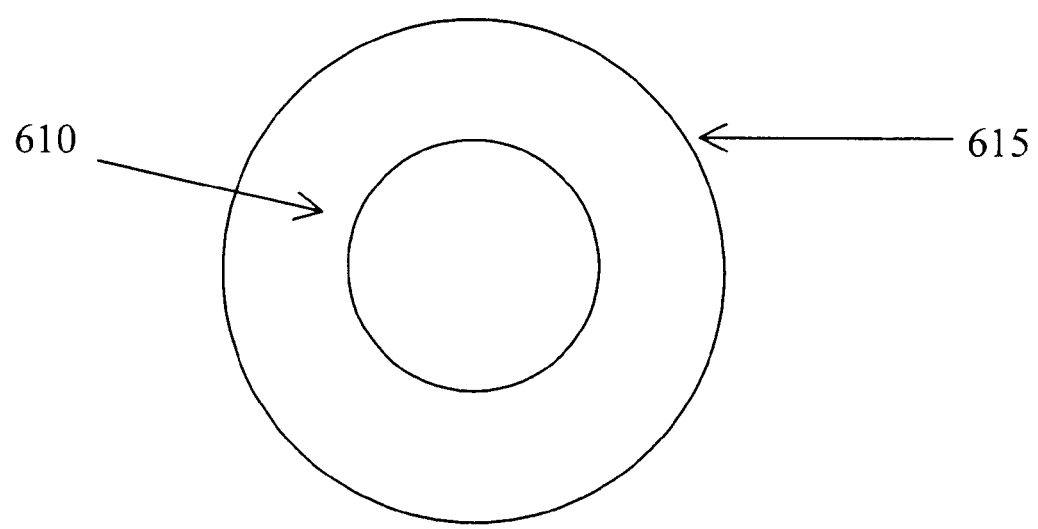
FIG. 6E shows a top view of an HSV colorspace after thresholding according to an embodiment of the present invention.

FIG. 6E shows a top view of the HSV colorspace after thresholding according to an embodiment of the present invention. All of the pixel data for the thresholded HSV colorspace lies between the inner surface formed by the inner boundary 610 and the outer surface formed by the outer boundary 615.

The thresholded HSV data for the pixels may then be processed by a calibration program. During processing, the program determines whether the pixels in the object selected by the user may be tracked. The trackability of a selected object in the video window 300 is determined based upon a probability distribution of the Saturation and of the Hue of the pixels selected within the calibration rectangle 305.

In the preferred embodiment, the system may track objects of certain Hues. For example, the system may be programmed to track wristbands having only yellow or green Hues. In such an embodiment, if the mean Hue calculated from the pixels in the calibration box is outside of a predetermined range, then the system will not calibrate on the selected object.

The standard deviation of the Hue and of the Saturation is also calculated, to ensure that it is below a certain level. Too much variation in Hue or Saturation makes the tracking ability less reliable. In the preferred embodiment, the system is used for tracking highly-saturated colored object of substantially uniform Hue and Saturation. The system is not intended for tracking plaid or objects in the gray scale. It can track objects of moderate to high Saturation, but not grayish objects. The system will only track an object if the standard deviation of the Hue and Saturation is below a certain amount.

In other embodiments, two calibration rectangles 305 may be used. In one embodiment, calibration occurs with respect to a first colored object. After calibration, a second colored object may be calibrated. This is especially useful for rigid multi-colored objects. In such an embodiment, the program not only tracks the object, but also knows the angle of the object relative to static objects in an image, etc.

In an additional embodiment, two calibration rectangles 305 are simultaneously utilized in the video display widow 200. The pixels representing the objects in each calibration rectangle 305 may be simultaneously calibrated. In one embodiment, the calibration rectangles 305 are at fixed locations in the video display window 200. In another embodiment, the calibration rectangles 305 are moveable relative to each other. In such an embodiment, calibration may only occur if the objects in each window both have standard deviations below a set level. In an additional embodiment, multiple objects are tracked, but only one calibration window is utilized. First, one object must be calibrated and tracked. Thereafter, additional objects may be calibrated and tracked.

More than one frame of data is utilized during the calibration process. In the preferred embodiment, three frames of data are used. If the Hue and Saturation means and standard deviations are acceptable for three consecutive frames, the program is calibrated. This ensures that any anomalies in individual frames do not result in the calibration of an untrackable object.

The number of frames per second of data is dependant upon the bus used by the digital camera to get the data to the computer. A sampling rate of 30 frames/second may be used for video display windows of less than 160×120. For a video display window of 320×240, the sampling rate may be around 15 frames per second. With a Peripheral Component Interconnect ("PCI") camera, a larger frame and a faster sampling rate are possible.

Figure 7A:
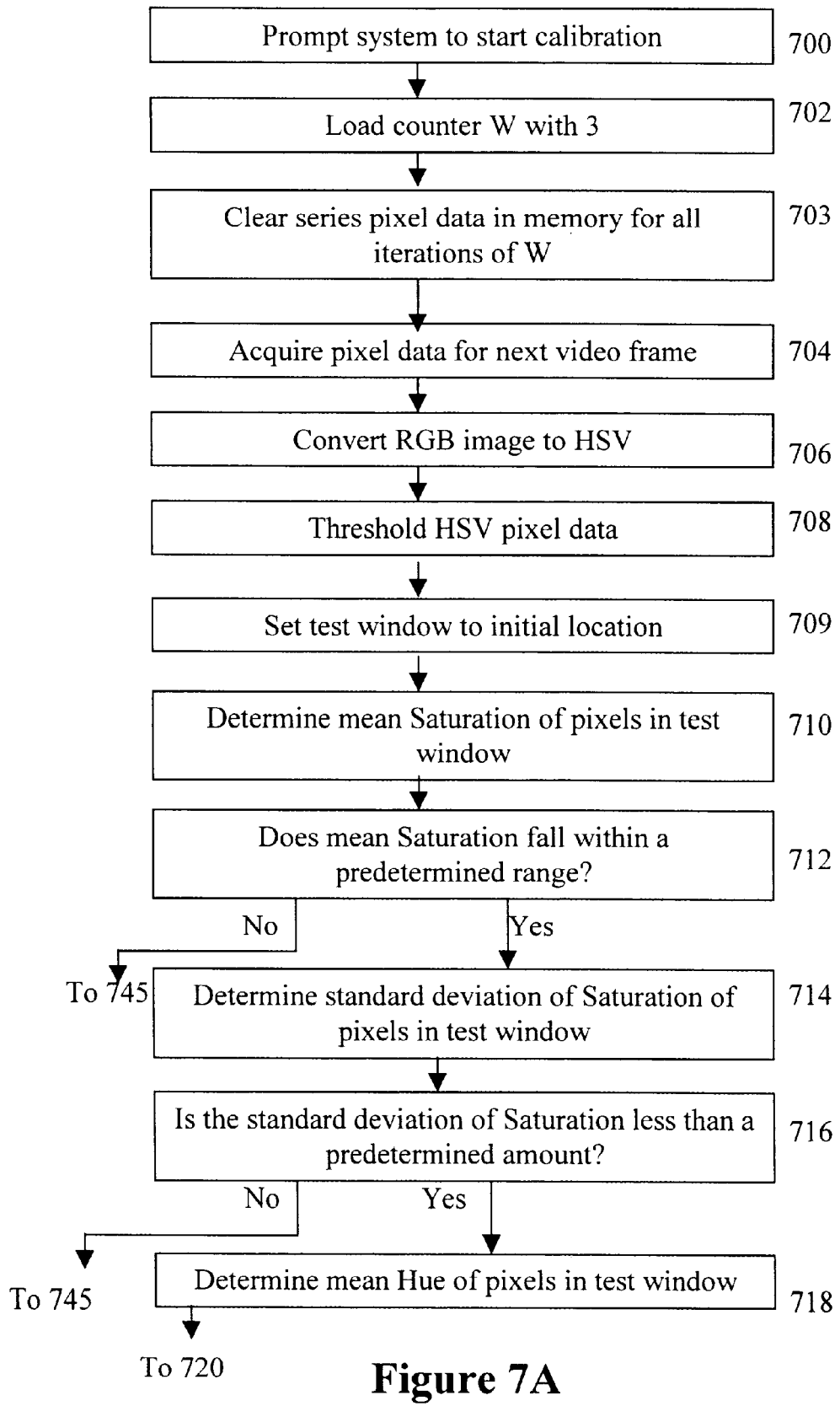
FIG. 7A illustrates a first part calibration process according to an embodiment of the present invention.

FIG. 7A illustrates a first part of a calibration process according to an embodiment of the present invention. First, the system must be prompted 700 to begin calibration. In the preferred embodiment, a user places an object in front of the webcam 215, and when the object is shown of the video display window 300 is being within the calibration rectangle 305, the user prompts the system to begin calibration. In other embodiments, the user may move the calibration rectangle 305 within the video display window 300 to select an object to be tracked. A counter W is then loaded 702 with the number "3", however any other suitable number may be utilized. In the preferred embodiment, the system takes pixel data from three "acceptable frames" and uses that data to create a pixel calibration map (the pixel classification map is discussed in detail below). The processing described in FIGS. 7A–7D determines which frames are acceptable. The data from the three acceptable frames is known as the "series data."

At step 703, the system clears any series pixel data already stored in memory. Next, the system acquires 704 pixel data for a video frame and converts 706 the RGB pixel information into the HSV colorspace. There are many application programs in the art capable of making this conversion. The HSV pixel data is then thresholded 708. In the preferred embodiment, a thresholding function dependent upon the S and V components of the pixel data is utilized by the thresholding function. In other embodiments, the H component may also be used. During the conversion from RGB to HSV, the S and V data is determined more quickly than the H data. Therefore, since H is not used in the thresholding function of the preferred embodiment, the HSV colorspace may be thresholded while the H coordinates are being calculated.

The system then begins to analyze several "test windows" of data for each frame. A test window is a block of pixel data that is the same size as the calibration rectangle, and is located near the calibration rectangle. The system analyzes these surrounding pixels because, since the preferred embodiment does not allow the user to move the calibration rectangle, the user must physically place an object in front of the webcam 215 and attempt to manually situate the object so that it will fall within the calibration rectangle, as displayed on the computer monitor. This ensures that the system uses the best possible data for calibration.

Figure 7B:
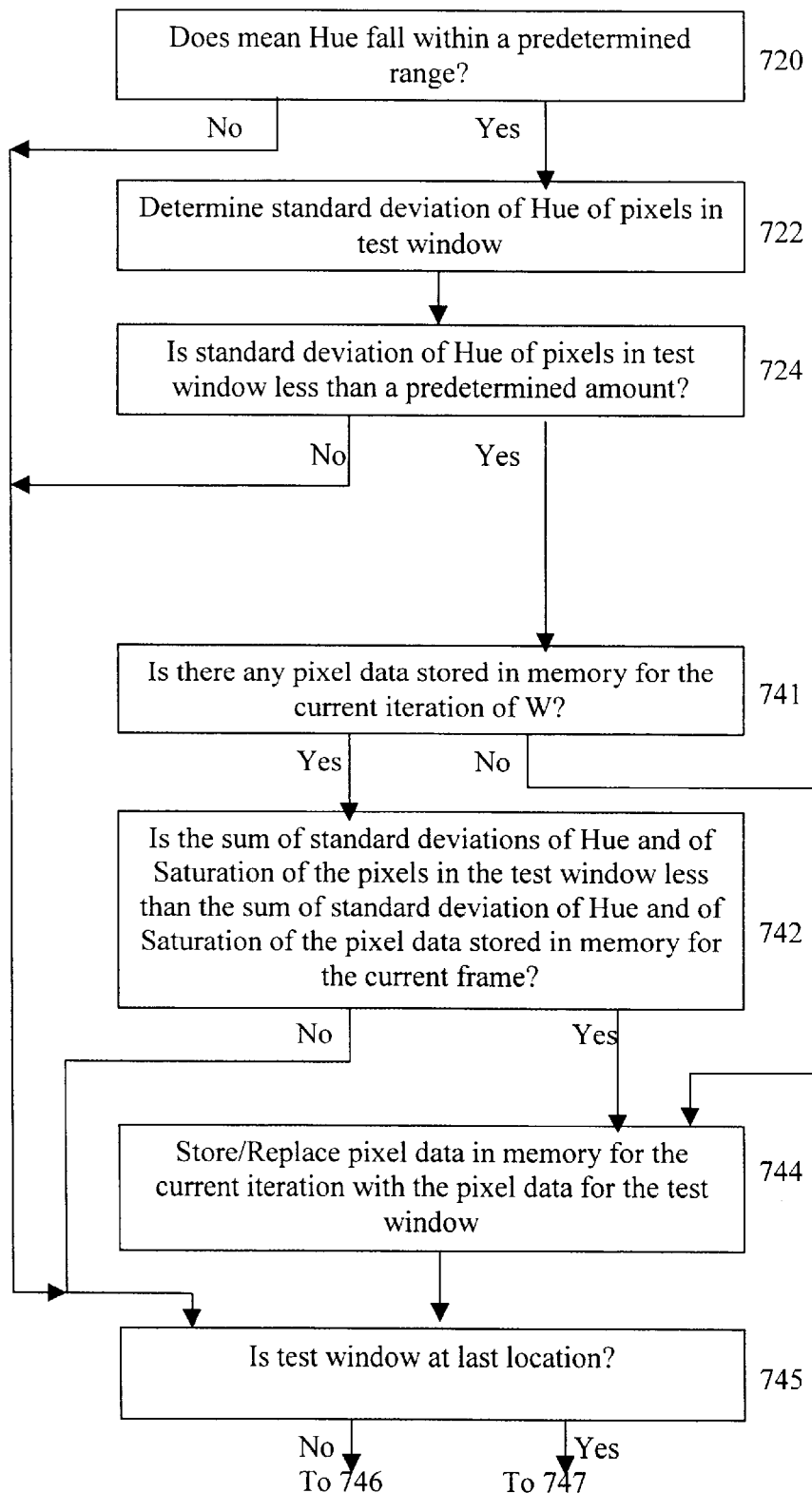
FIG. 7B illustrates a second part of a calibration process according to an embodiment of the present invention.
Figure 7C:
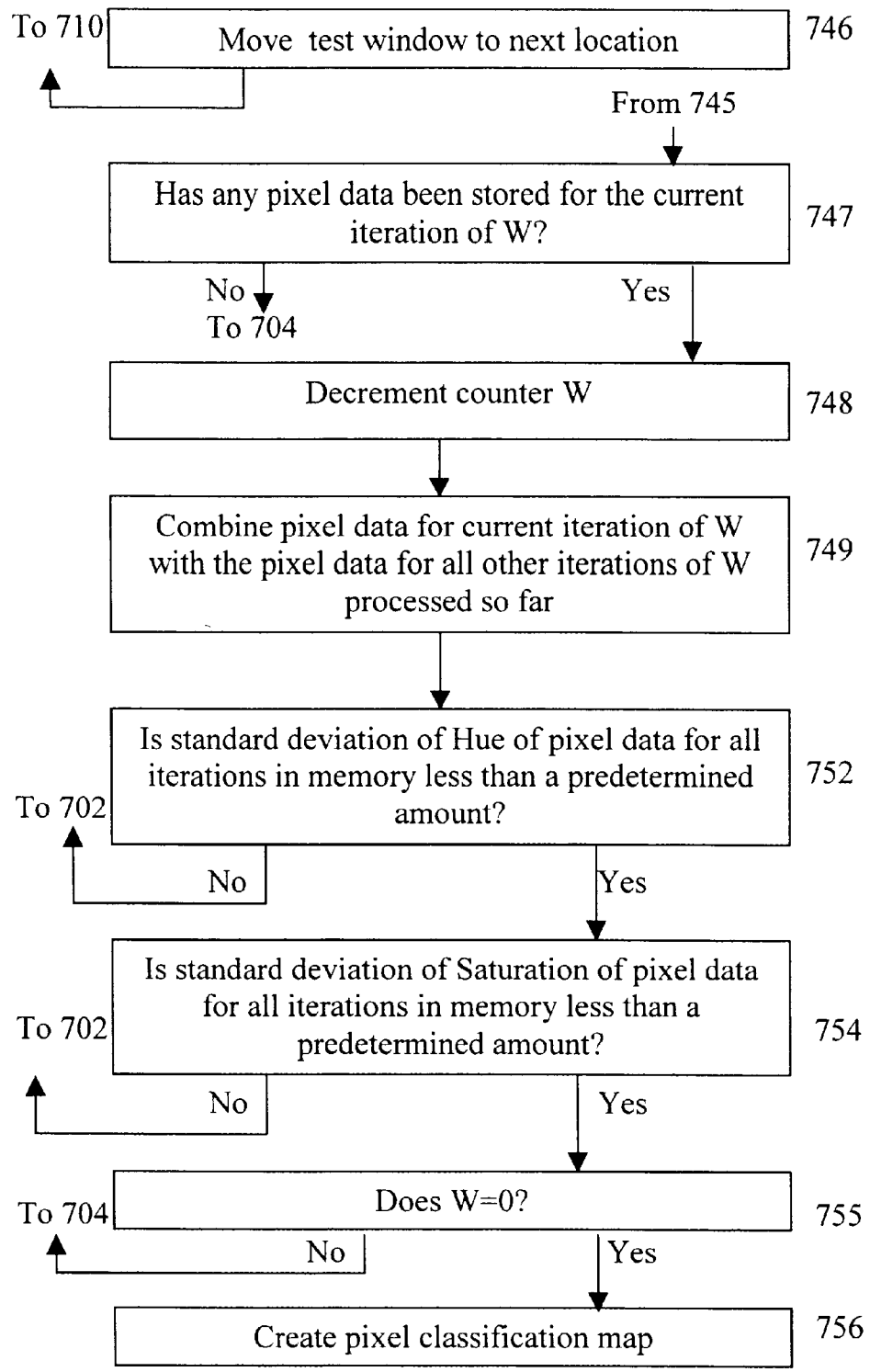
FIG. 7C illustrates a third part of the calibration process according to an embodiment of the present invention.
Figure 7D:
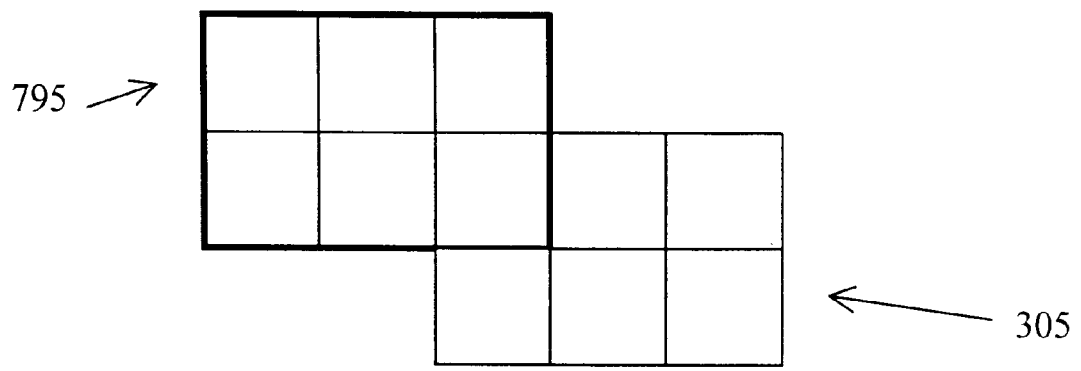
FIG. 7D illustrates a first test window's location according to an embodiment of the present invention.

FIG. 7D illustrates a first test window's location according to an embodiment of the present invention. The claibration rectangle 305 is three pixels wide and two pixels tall (3×2). In an embodiment having a 3×2 calibration rectangle 305, the test window is also 3×2. The system first analyzes the group of six pixels for a 3×2 area located two pixels to the left and one pixel up from the location of the calibration box 305. As shown in FIG. 7D, there is an overlap of one pixel between the calibration box 305 and the test window 795. The system acquires the pixel data for this group of pixels. Then, the system shifts the test window 795 to the next location.

Figure 7E:
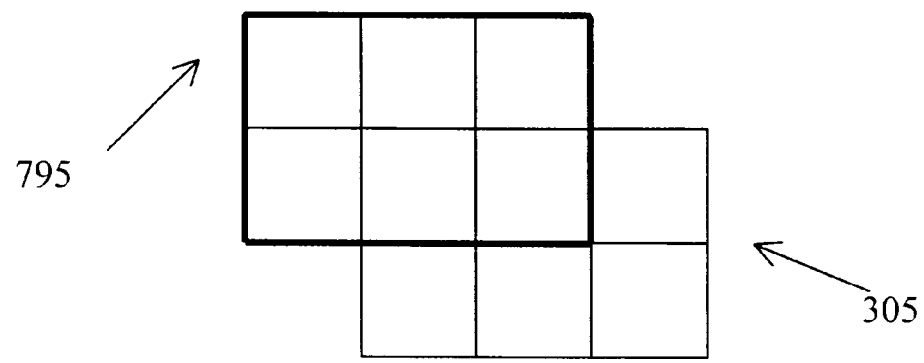
FIG. 7E illustrations a second test window's 795 location according to an embodiment of the present invention.

FIG. 7E illustrations a second test window's 795 location according to an embodiment of the present invention. In FIG. 7E, the entire test window as been shifted 1 row to the right. This time the test window 795 has an overlap of 2 pixels with the calibration rectangle. After the pixel data is acquired for this group of pixels, the test window 795 is shifted again. In the preferred embodiment, the test window 795 is shifted to the right three additional times, at which point the only overlap between the calibration rectangle 305 and the test window 795 is 1 pixel: the pixel in the bottom left-hand corner of the test window, which overlaps the pixel in the upper right-hand corner of the calibration rectangle 305. The test window is then shift down one row and four columns to the left, so that the two pixels on the right side of the test window 795 overlap the two pixels on the left side of the calibration rectangle 305. The process is repeated, and the test window is shifted to the right until the only overlap between the test window 795 and the calibration rectangle 305 is the pixels on the left side of the test window 795 and the pixels on the right side of the calibration rectangle 305.

The same process is then repeated with the test window shifted down one additional row. The last test window location has an overlap of one pixel between the test window 795 and the calibration rectangle 305—the upper left-hand corner of the test window 795 and the lower right-hand corner of the calibration rectangle 305. In other embodiments, the different number of iterations may occur.

Returning to the process illustrated in FIG. 7A, after the HSV pixel data is thresholded 708, the test window 709 is set to its initial location. Then, the mean Saturation of the pixels in the test window 795 is determined 710. At step 712, if the mean Saturation falls outside of a predetermined range, the system determines the data from that test window 795 is not good, and the system jumps to step 745. However, if at step 712 the system determines that the mean Saturation does fall within the predetermined range, the standard deviation of the pixels in the test window 795 is determined 714. If the standard deviation of Saturation is determined 716 to be greater than a predetermined amount, then the system determines the pixel data from that test window 795 is not good, and the system jumps to step 745. However, if the system determines 716 that the standard deviation of Saturation is less than a predetermined amount, then the system proceeds to step 718 and determines the mean Hue of the pixels in the test window 795. The system then jumps to step 720 as shown in FIG. 7B.

FIG. 7B illustrates a second part of the calibration process according to an embodiment of the present invention. If the system determines 720 that the mean Hue falls outside of a predetermined range, the system concludes the pixel data from the test window 795 is not good, and the system jumps to step 745. However, if the Hue data is within the predetermined range, the system determines 722 the standard deviation of the Hue of pixels in the test window 795. If the standard deviation of Hue of the pixels in the test window is determined 724 to be greater than a predetermined amount, the system determines the pixel data from the test window 795 is not good, and the system jumps to step 745. If the standard deviation is determined 724 to be less than the predetermined amount, processing jumps to step 741.

Next, the system determines 741 whether any pixel data is already stored in memory for the current iteration of counter W. If there is not, processing jumps to step 744. If there is, then at step 742, the system determines 742 whether the sum of the standard deviations of Hue and of Saturation of the pixels in the test window 795 is less than the sum of the standard deviations of Hue and of Saturation of the pixel data in memory. If it is greater, processing jumps to step 745. If it is less, the pixel data stored in memory for the current iteration (if counter W is still contains the number "3", it is the first iteration; if it contains "2", it is the second iteration, and so on), is replaced 744 with the pixel data from the test window. At step 744, pixel data for the test window 795 for the current iteration is stored/replaces in memory.

Next, at step 745, the system determines whether the test window 795 is at the last location. If it is at the last location, processing jumps to step 747. If it is not, processing jumps to step 746.

FIG. 7C illustrates a third part of the calibration process according to an embodiment of the present invention. At step 746, the system moves the test window 795 to the next location, and then jumps to step 710. The system then determines 747 whether any pixel data has been stored for the current iteration of counter W. If none has, processing jumps to step 704. If pixel data has been stored, the counter W is decremented 748. The system then combines 749 the pixel data for the current iterations of W with the pixel data for all other iterations of counter W processed so far.

Next, the system determines 752 whether the standard deviation of Hue of the pixel data for all iterations stored in memory is less than a predetermined amount. If it is not, the system determines that the data for all iterations is bad, and processing restarts at step 702. If it is less than the predetermined amount, processing proceeds to step 754. If the standard deviation of the Saturation of pixel data for all iterations stored in memory is determined 754 to be greater than a predetermined amount, then the system determines that the pixel data from all iterations is bad, the processing restarts at step 702. However, if the standard deviation of Saturation is less than the predetermined amount, the data is determined to be acceptable, and a pixel classification map is created 756.

Figure 8A:
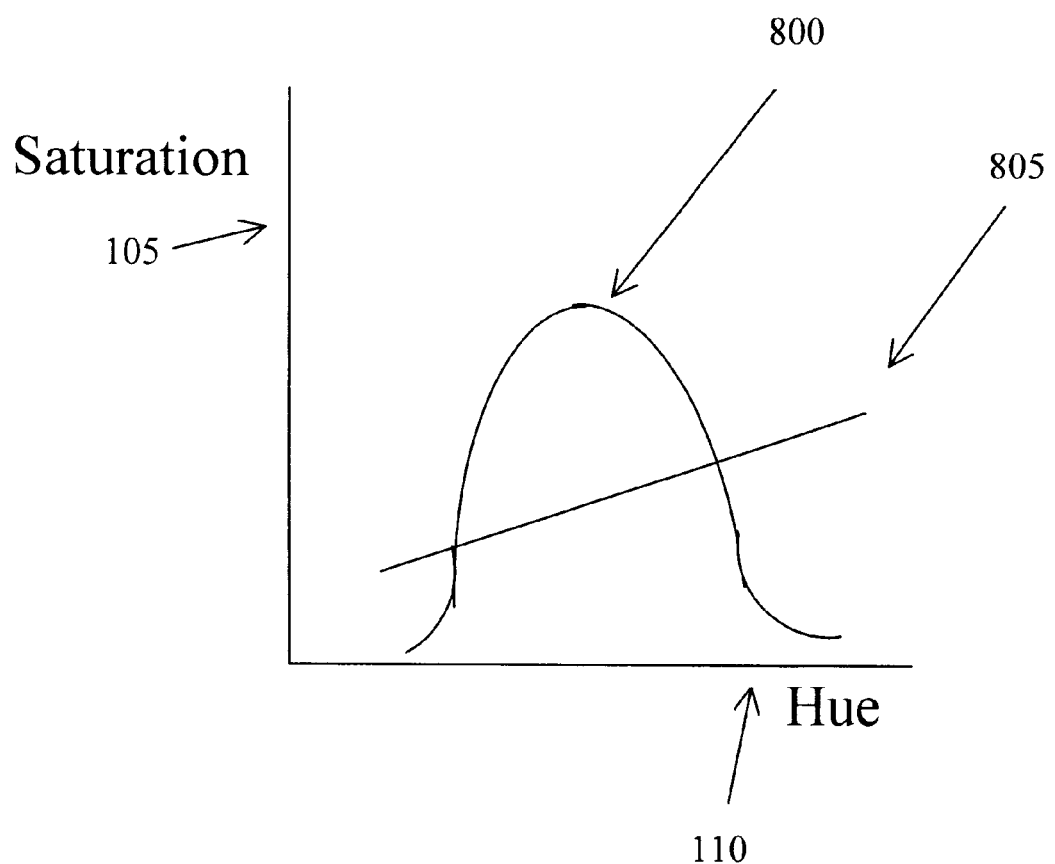
FIG. 8A illustrates a Gaussian probability curve for a selected object and a background pixel threshold according to an embodiment of the present invention.

FIG. 8A illustrates a Gaussian probability curve for a selected object and a background pixel threshold according to an embodiment of the present invention. The Hue and Saturations of the pixels in the background of each iteration of the video frame that were used during the calibration processing illustrated in FIGS. 7A–7C are used to create the background pixel threshold. FIG. 8A illustrates a 3-dimensional graph. The graph has an H coordinate 110 and an S coordinate 105. A Gaussian probability curve 800 and a background pixel threshold 805 are both shown. The Gaussian probability curve is a symmetrical bell-shaped curve representing the distribution of Hues and their associated Saturations for the tracked object. The background pixel threshold represents the distribution of Hues and associated Saturations for pixels belonging to the background.

The bell curve shape shown in FIG. 8A is 3-dimensional. If the H and S axes represent XY coordinates in an XYZ coordinate system, the Gaussian curve extends in the Z direction, in a direction perpendicular to the plane formed by the H and S axes. The Gaussian curve, shown in a 3-dimensional space, generally resembles a bell. However, the bell need not necessarily sweep out a circular path. Instead, it might sweep out an elliptical path. In other words, the distance between a center point (centered with respect to the H and S coordinates) and a side of the Gaussian curve in the H direction need not be the same distance between the center and a side of the Gaussian curve in the S direction.

Figure 8B:
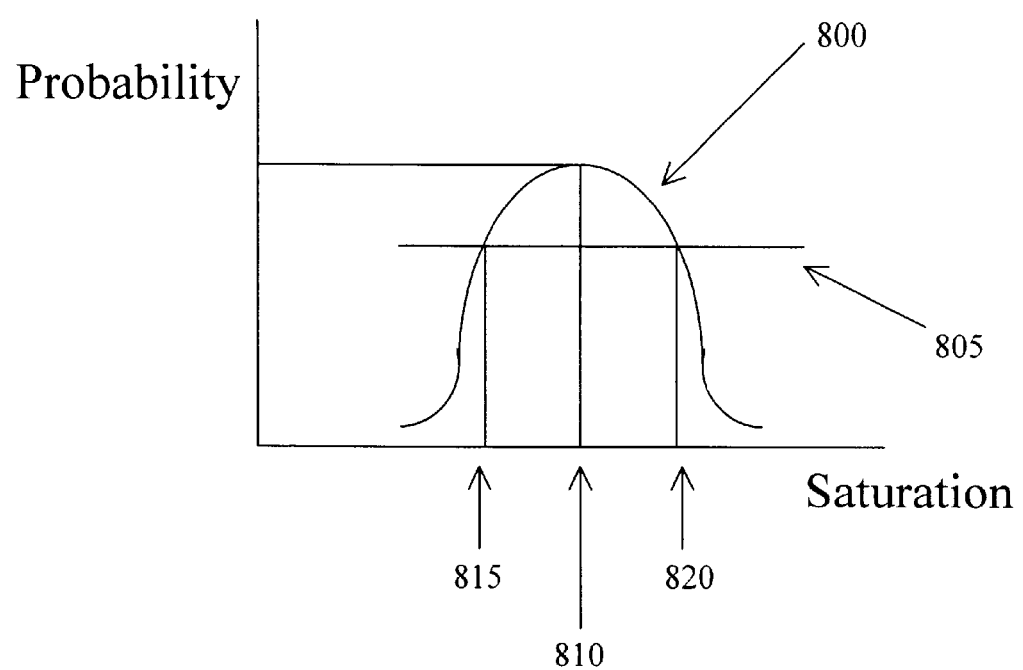
FIG. 8B illustrates a probability distribution of pixel data only with respect to Saturation according to an embodiment of the present invention.

FIG. 8B illustrates a probability distribution of the pixel data only with respect to Saturation according to an embodiment of the present invention. The part of the Gaussian curve 800 above the noise threshold level 805 represents the Saturation of pixels most likely to belong to the selected object. The mean Saturation is shown as the center 810 of the Gaussian curve. So, as shown in FIG. 8B, the Saturation pixels most likely to belong to the selected object lies between a lower bound 815 and an upper bound 820. For a symmetrical Gaussian curve, the distance in terms of Saturation levels between the mean and each bound is equivalent. The term $R_1$ (see FIG. 9) is hereinafter utilized to refer to the difference in terms of Saturation levels between the Saturation mean 810 and each of the lower bound 815 and the upper bound 820.

Figure 8C:
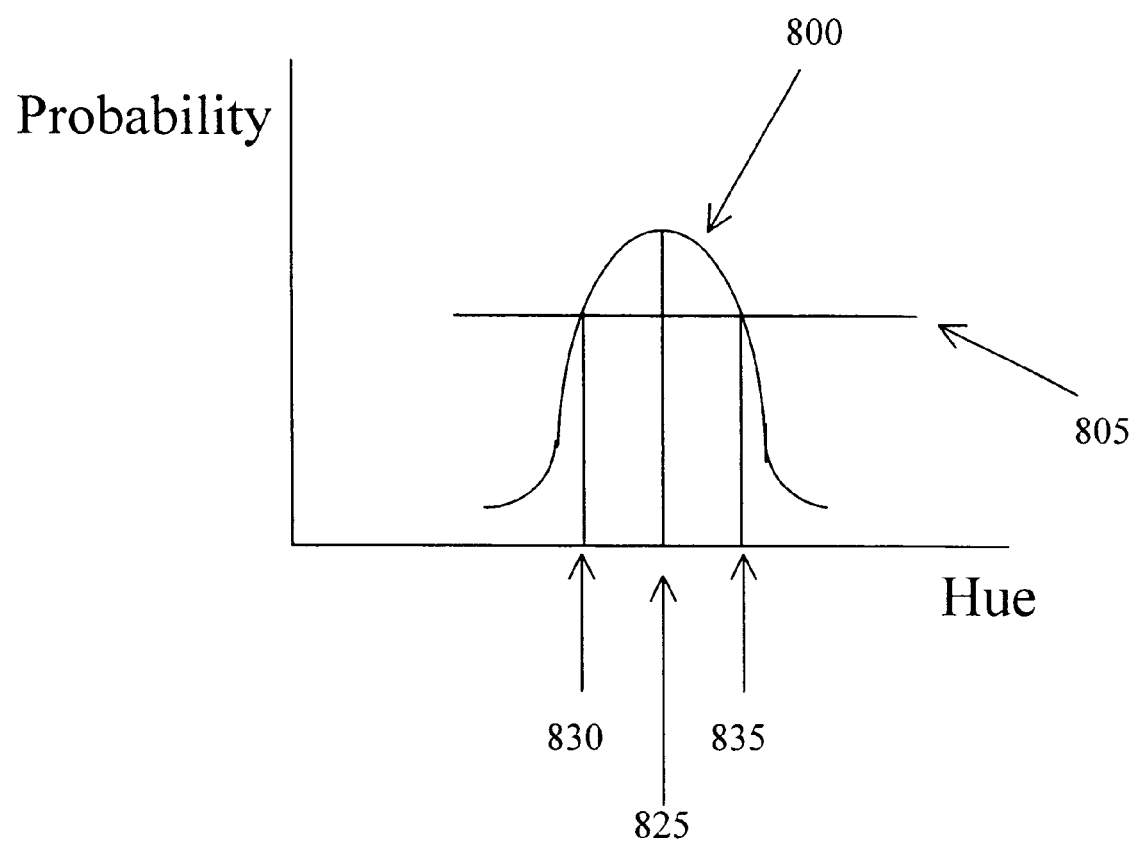
FIG. 8C illustrates a probability distribution of pixel data only with respect to Hue according to an embodiment of the present invention.

FIG. 8C illustrates a probability distribution of the pixel data only with respect to Hue according to an embodiment of the present invention. The Gaussian curve shown in FIG. 8C is similar to the one shown in FIG. 8B. However, the Gaussian curve in FIG. 8C is narrower than the Gaussian curve shown in FIG. 8B. Therefore, the difference between a mean Hue 825 and each of a lower Hue bound 830 and an upper Hue bound 835 is relatively less than the difference between the mean Saturation 810 and each of the lower Saturation 815 bound and the upper Saturation bound 820. The term $R_2$ (see FIG. 9) is hereinafter utilized to refer to the difference in terms of Hue levels between the Hue mean 825 and each of the lower bound 830 and the upper bound 835.

The probability distribution Hue and Saturation of the pixels representing the selected object in the preferred embodiment has the shape of a Gaussian curve. However, in other embodiment, the probability curve may have other shapes. For example, in FIG. 8B, the distance between the center Saturation 810 and the lower Saturation boundary 815 may be larger than the distance between the center Saturation 810 and the upper Saturation boundary 820. Also, the background noise threshold 805 need not be uniform. In fact, the background noise threshold 805 level will almost never be uniform unless the background is completely black or completely white. In such alternative embodiment, the noise threshold may be jagged, for example.

Figure 9:
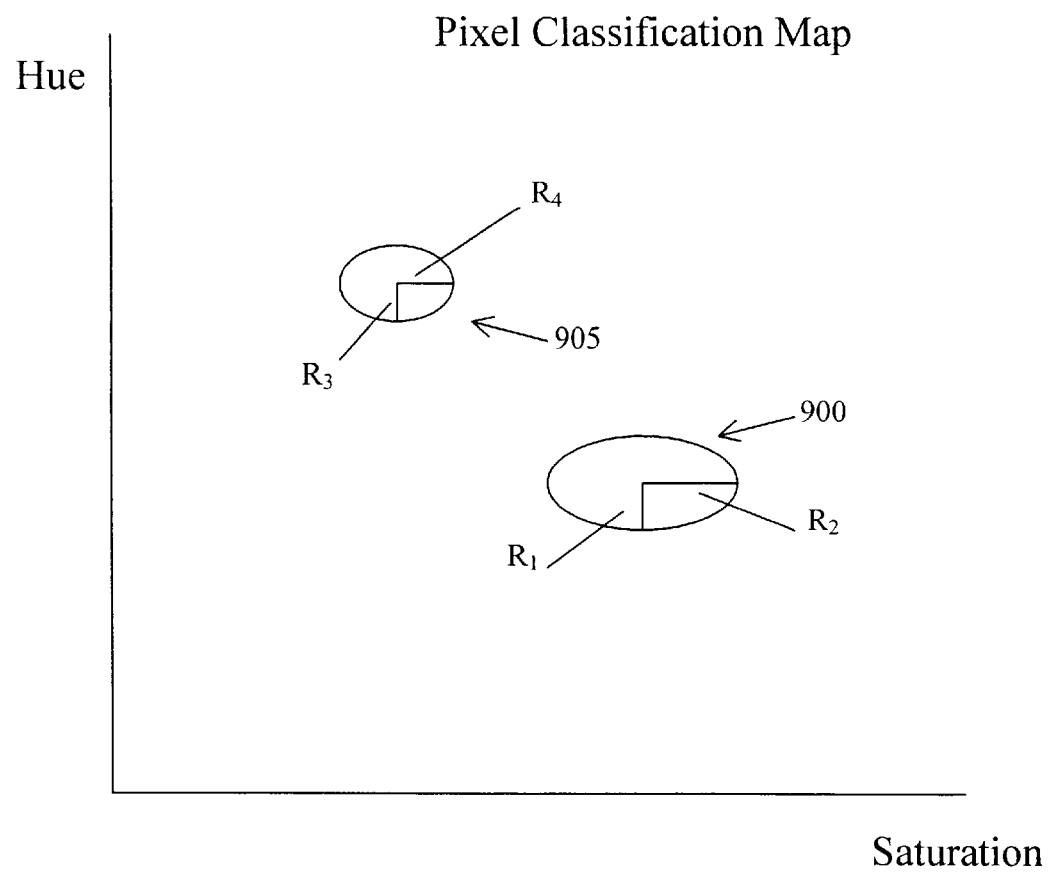
FIG. 9 illustrates a pixel classification according to an embodiment of the present invention.

FIG. 9 illustrates a pixel classification map according to an embodiment of the present invention. The pixel classification map has the same H and S coordinates as the Gaussian curve in FIG. 8A. Two "blops" are shown is FIG. 9. A blop is an elliptical object drawn on the graph. Each blop represents pixel data for a tracked object. The Hue mean 825 and Saturation mean 810 are each at the center of each blop. Each blop may be formed from the intersection of the Gaussian curve and the noise level as illustrated in FIG. 8. For example, the Hue and Saturation data for the curves shown in FIGS. 8A–8C are illustrated in the lower blop 900 drawn on the pixel classification map. The radius in the H direction R1 represents the difference between the Hue mean and each of the upper Hue bound and the lower Hue bound as shown in FIGS. 8A–8C. A blop 905 for another tracked object is also shown. For the second blop 905, the difference between the mean Hue and each of a lower bound and an upper bound of the Hue is represented by R3. The difference between the mean Saturation and each of a lower bound and an upper bound is represented by R4. Each of the elliptical blops shown in the pixel classification map shows which pixels are associated with each selected object. For the lower blop 900, any pixels having both Hue and Saturation levels falling within that blop are determined to be a part of the selected object. The same is true with respect to the other blop 905.

In embodiments where the probability distributions of Hue and Saturation do not have a Gaussian shape, or the noise threshold in not uniform, the blops on the pixel classification map may not have an elliptical shape.

To process video frames, the system analyzes each pixel, and determines whether each pixel may be a part of object A, B, or the background. The pixel classification map tells the system how to classify the pixels. If a pixel falls within the blop, it is associated with that object. Each object has its own ellipse. A binary image map is generated from the application of the pixel data in a frame to the pixel classification map. In other words, in an embodiment with a video frame size of 120×160 pixels, there are 19,200 pixels (120*160). If any of the pixels fall within a blop on the pixel classification map, that pixel is represented by a "1" in a binary map. All of the pixels not falling within a blop are assigned a "0" in the binary map. When the frame has been completely mapped, there are 19,200 bits of data, one for each pixel. This binary map may then be utilized for tracking purposes.

Once all of the calibration data has been acquired, the entire frame is analyzed. The processing determines where the selected object must be. The program looks for the object around the calibration rectangle 305. If the object is not found, the program determines that the calibration data is faulty and recalibrates. The program may also find an object that is much larger than the calibration rectangle 305, in which case calibration must be redone, because it is too difficult to track a large object of uniform color.

Background information is also collected during calibration. When making the probability curves utilized to create the pixel map, the background data is raise the noise level of the background. The background data is utilized to remove areas of the video window 200 that it determines do not belong to the object. The removed background pixels are typically areas of the background that resemble the object.

Figure 10:
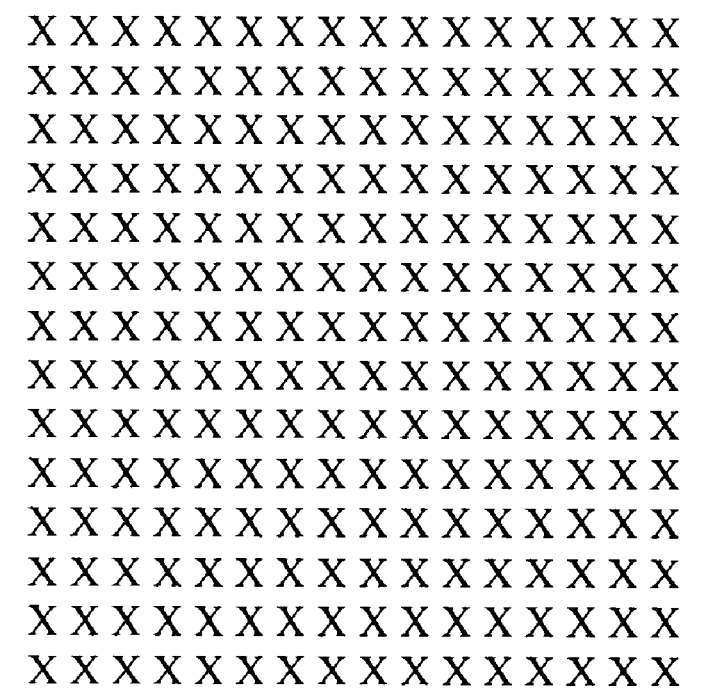
FIG. 10 illustrates an image in a video display window according to an embodiment of the present invention.

The system takes the HSV data array for the pixels in the frame, applies the data array to the pixel classification map, and creates a binary image. FIG. 10 illustrates an image in the video display window according to an embodiment of the present invention. The image in FIG. 10 has 16 columns of pixels (located in the x-direction in an xy coordinate plane) and 14 rows of pixels (located in the y-direction of an xy coordinate plane). There are a total of 224 pixels in the image (14*16). Each "X" shown in FIG. 10 represents a pixel. After the calibration process has been completed, the pixel classification map is applied to each pixel in the image. All pixels falling within a blop representing an object to be tracked are represented with a "1" in the binary image. All pixels not falling within a blop are represented with a "0" in the binary image.

Figure 11:
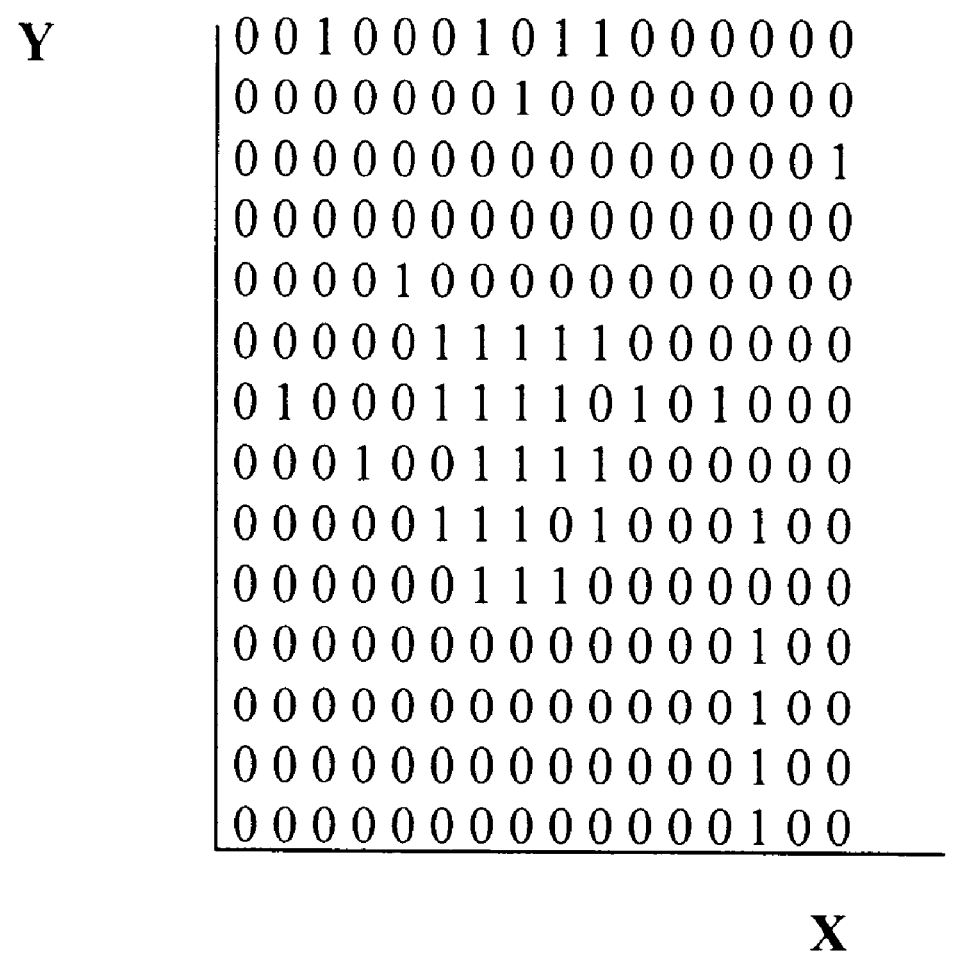

FIG. 11 illustrates a binary image according to an embodiment of the present invention. Each "1" represents a pixel having a Hue and Saturation falling with the blop range of a tracked object. While there is a concentration of "1's" around the center of the binary image, there are also several "1's" scattered throughout the rest of the image. Some of the "1's" represent pixels of the object to be tracked. Some represent noise not associated with the image. Because the "1's" located around the edges of the image are likely not a part of the image, the system preferably filters them out, as explained below.

Figure 12A:
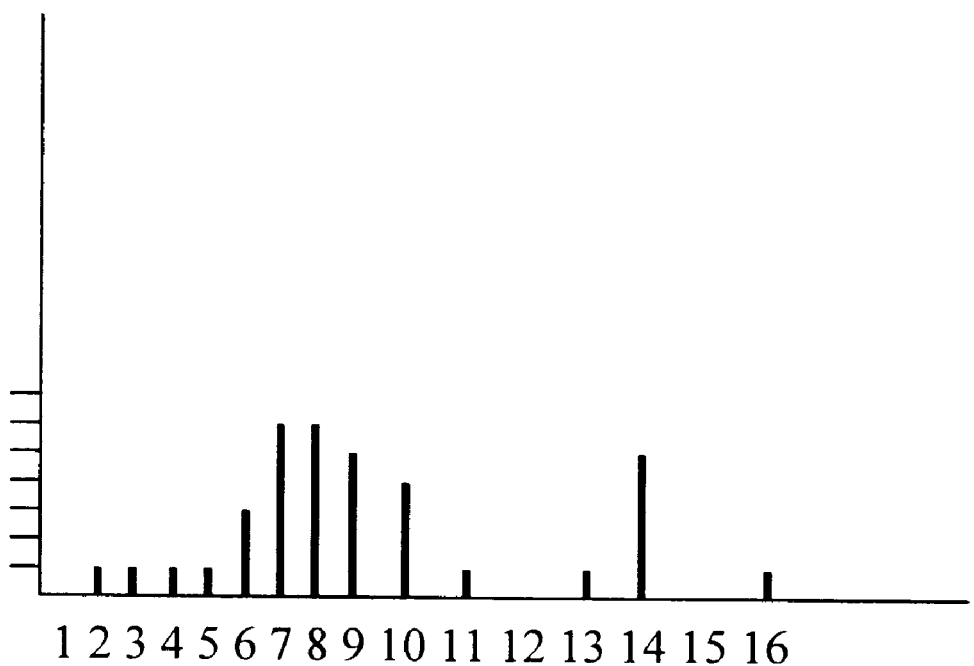
FIG. 12A illustrates a histogram of the columns of pixels according to an embodiment of the present invention.

FIG. 12A illustrates a histogram of the columns of pixels according to an embodiment of the present invention. The histogram is created by summing the "1's" located in each of the 16 columns of the binary image. As shown in FIG. 12A, although most of the "1" pixels are located around columns 7–9, there are also "5" pixels located in the 14th column. The system determines that the pixels in the 14th column are likely pixels having Saturation and Hue levels corresponding to a blop of a selected object. Since these pixels are from the main concentration of pixels around columns 7–9, a low-pass filter is applied to the histogram to reduce the effect of such pixels. A low pass filter in the form of $Z(n)=(¼)*F(n-1)+(½)*F(n)+(¼)*F(n+1)$ may be utilized. The function F(n) represents the number of pixels in column n of the histogram before filtering. The function Z(n) represents the number of pixels in column n of the histogram after filtering. Other embodiments may utilize filters that use data from more than three columns to determine a filtered result, or may use nay other type of suitable filter.

Figure 12B:
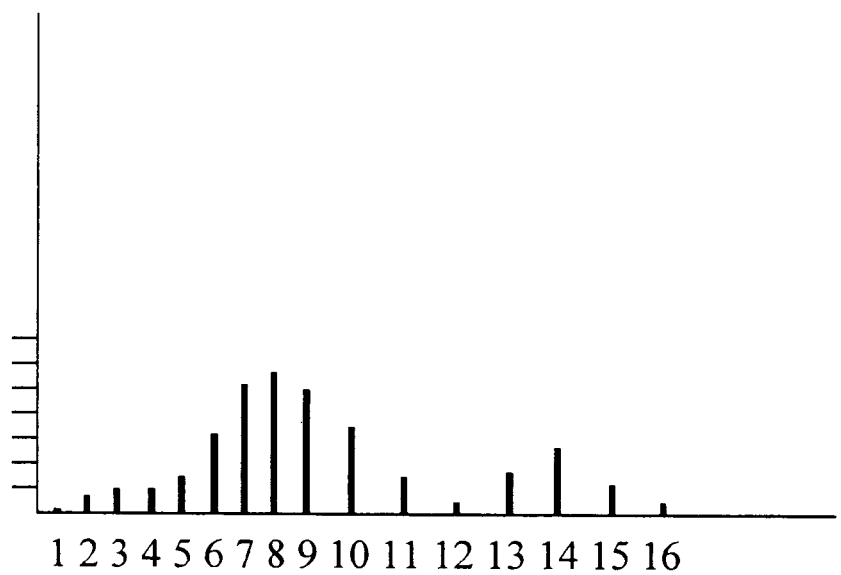
FIG. 12B illustrates a histogram of the columns of pixels after application of a low-pass filter according to an embodiment of the present invention.

FIG. 12B illustrates a histogram of the columns of pixels after application of a low-pass filter according to an embodiment of the present invention. As shown in FIG. 12B, the pixel amounts in isolated columns of pixels, such as in column 14, have been reduced. Column 14 was represented by "5" before filtering. After filtering, column 14 is represented by "2.5".

Figure 13A:
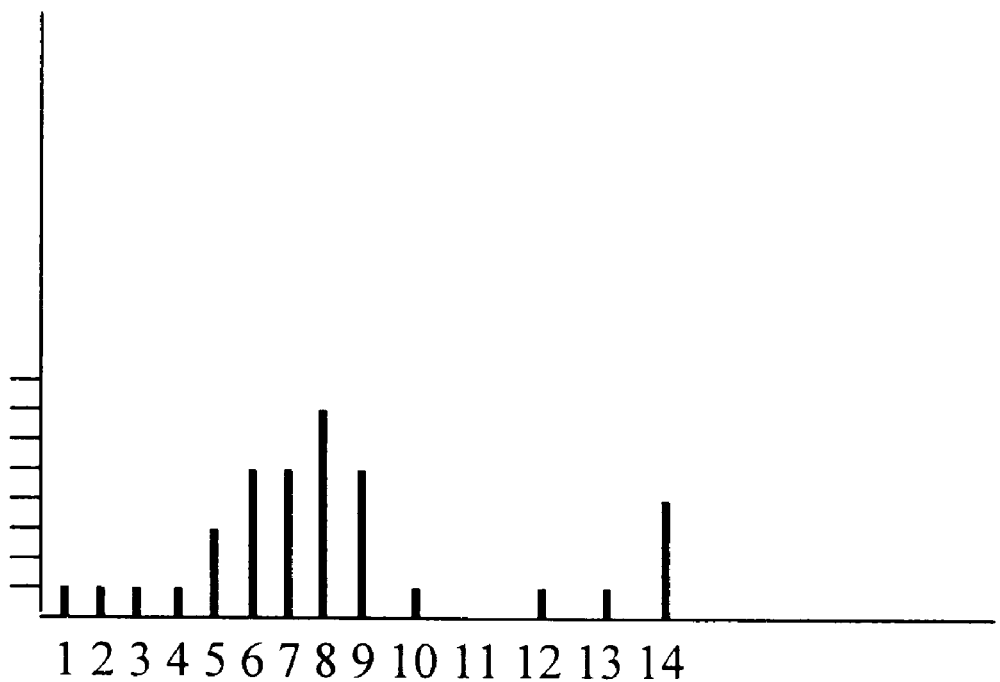
FIG. 13A illustrates a histogram of the rows of pixels according to an embodiment of the present invention.

FIG. 13A illustrates a histogram of the rows of pixels according to an embodiment of the present invention. The histogram is created by summing the "1's" located in each of the 14 rows of the binary image.

Figure 13B:
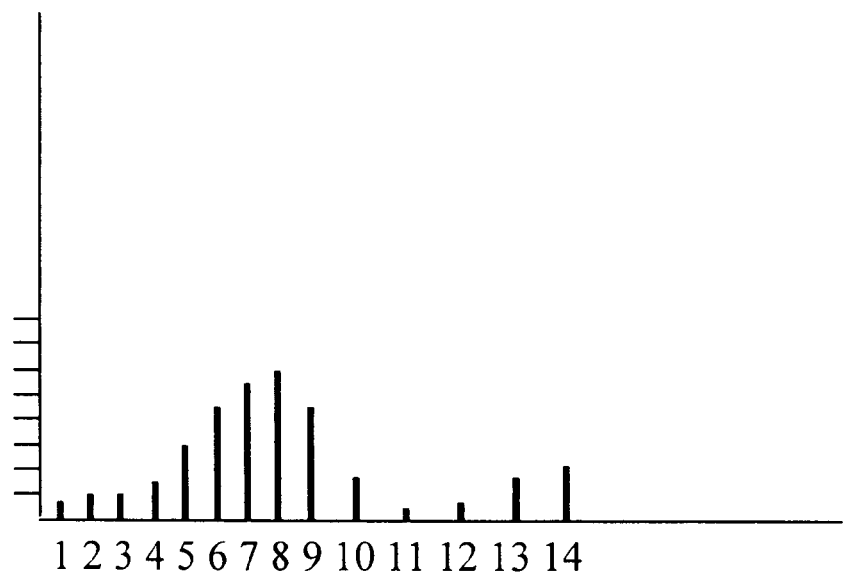
FIG. 13B illustrates a histogram of the rows of pixels after application of a low-pass filter according to an embodiment of the present invention.

FIG. 13B illustrates a histogram of the rows of pixels after application of a low-pass filter according to an embodiment of the present invention. The same low pass filter that was applies to FIG. 12A was applied to FIG. 13A, resulting in the histogram shown in FIG. 13B.

In the histograms shown in FIGS. 12B and 13B, most of the pixels are located around certain rows or columns. With respect to the histogram of the columns, most of the pixels are located in columns 6–10. With respect to the histogram of the rows, most of the pixels are located in rows 5–9. The center of the object to be tracked is most likely within the concentrated are of pixels. However, even after filtering, there is a pixel concentration in the $12^{th}$ column, and a pixel concentration in the $14^{th}$ row, as well as smaller number of pixels in other columns. As mentioned, these clusters of pixels are likely the product pixels in the image having hue and saturation falling with the Hue and Saturation range of a blop. The pixels in rows and columns having small numbers of pixels are also most likely noise and are not considered when tracking the object. They are removed from consideration through a thresholding process.

Figure 14:
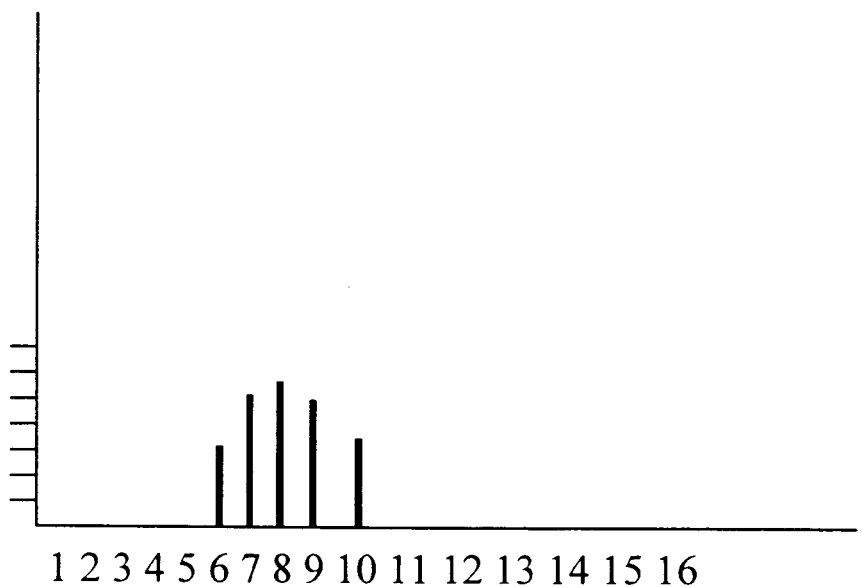
FIG. 14 illustrates a histogram of the pixels in the columns after all columns having a value of fewer than 3 pixel levels have been ignored according to an embodiment of the present invention.

FIG. 14 illustrates a histogram of the pixels in the columns after all columns having only 2 or fewer pixels have been thresholded out according to an embodiment of the present invention. As shown in FIG. 12, columns 2, 3, 4, 5, 11, 13, and 16 all had only 1 pixel in their respective column. In the histogram after thresholding, as illustrated in FIG. 14A, the pixels in those rows have been removed from consideration.

Figure 15:
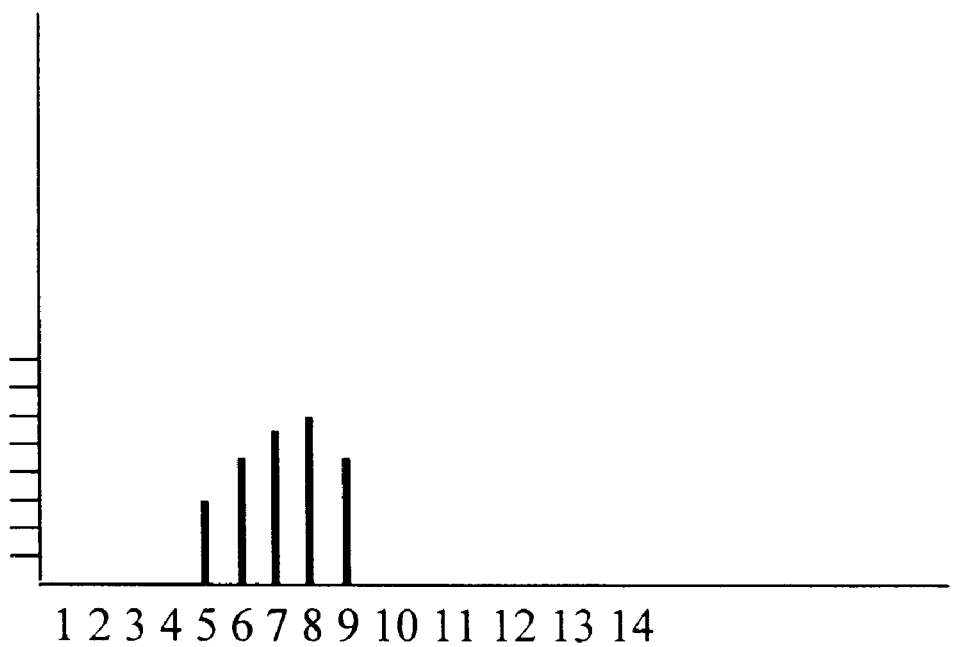
FIG. 15 illustrates a histogram of the pixels in the rows after all rows having a value of fewer than 3 pixel levels have been ignored according to an embodiment of the present invention.

FIG. 15 illustrates a histogram of the pixels in the rows after all rows having only 2 or fewer pixels have been ignored according to an embodiment of the present invention. As shown in FIG. 13, rows 1, 2, 3, 4, 10, 12, and 13 all had only 1 pixel in their respective column. In the histogram illustrated in FIG. 15, the pixels in those rows have been removed from consideration.

The center of the object is then estimated from the row and column histograms. The system determines the center based upon the row or column having the most "1" pixels. With respect to the histogram of columns, as shown in FIG. 14, two columns, 7 and 8, each have 6 "1's". The system therefore determined that either column 7 or 8 is the center column for the object. In the preferred embodiment, the center is randomly chosen between columns 7 and 8 since they have an identical number of pixels. In another embodiment, the number of pixels of each side of column 7 and 8 is utilized to determine the center column. Whichever column (i.e., column 7 or 8) has the most pixels on each side is determined to be the center of the tracked object. For example, there are 6 pixels in column 7 and 5 pixels in column 9. Therefore, there are 12 pixels in the columns adjacent to column 8. There are 3 pixels in column 6 and 6 pixels in column 8. Therefore, there are 9 pixels in the columns adjacent to column 7. Since there are more pixels in the columns adjacent to column 8, column 8 is determined to be the center column. If the number of "1" pixels located in the columns adjacent to both columns 7 and 8 had been identical, the system would have considered the number of "1" pixels in each of the columns 2 away from each of columns 7 and 8, and so on until the center was determined.

With respect to the rows of the histogram, row 8 is determined to be the center of the image, because it has the most "1" pixels in it.

Figure 16:
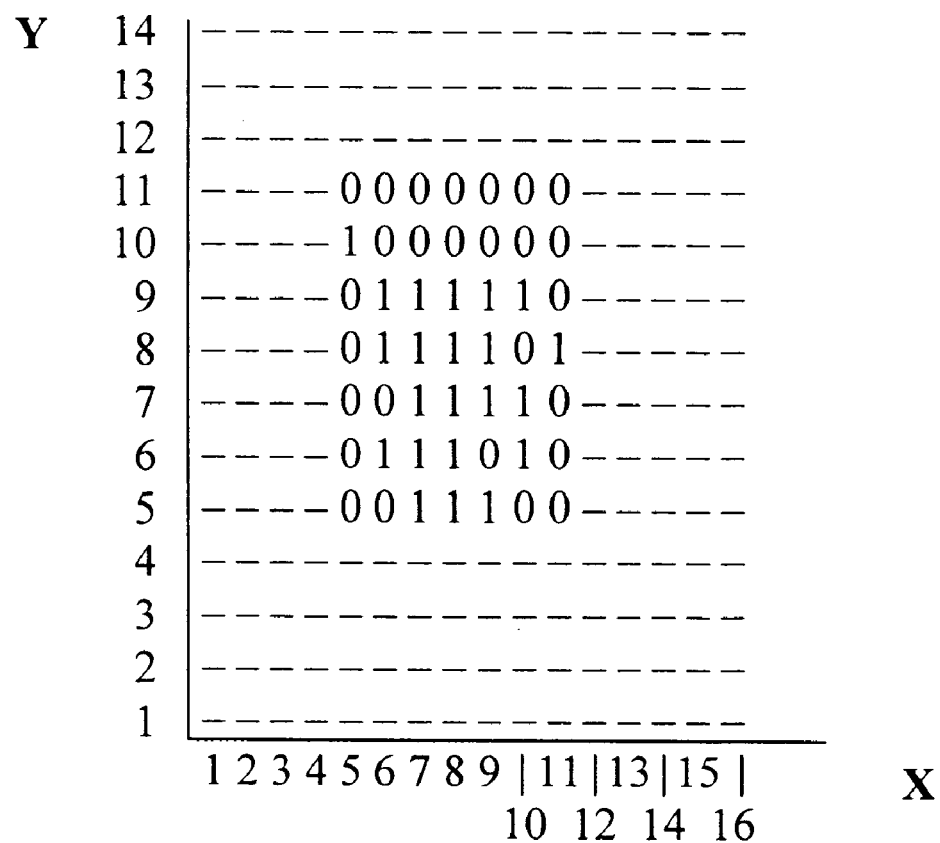
FIG. 16 illustrates an image frame having a search window according to an embodiment of the present invention.

Next, a "search window" is created for the object in the image frame. FIG. 16 illustrates the video display window 300 having a search window according to an embodiment of the present invention. The search window is utilized to more accurately determine the center of the object. Binary data for the pixel within the search window is created and processed to determine the center of the object. The size of the search window is first determined. The size of the search window is dependent upon the number of pixels present in the histogram. The estimated center of the image is the center of the search window. The center point of the search window is the pixel in the $8^{th}$ row and in the $8^{th}$ column. As shown in FIG. 14, there are six "1" pixels in the center column, column 8. The search window is determined from this data. In the preferred embodiment, the 3 rows of either side of the center row are utilized for the search window. A total of seven rows are therefore considered. The number of rows in the search window is either equal to, or one greater than, the number of "1" pixels in the center column of the histogram. The search window has an odd number of rows. If there had been 7 pixels in the center columns, 3 rows on each side of the center pixels would also have been considered. Therefore, if the histogram has an odd number of pixels in the center column of the histogram, then the total number of rows in the search window are equivalent to that number. Conversely, if the number of "1" pixels in the center column is even, then the number of rows in the search window is one greater than the number of "1" pixels in the center column. In this case, there were 6 pixels in the column 8, the center columns. Since this is an even number, seven rows are utilized in the search window, three on each side of the center pixel.

The number of columns are determined in a similar manner. Since there were seven "1" pixels in row 8, there are a total of 7 columns in the search window. Columns 5–11 of FIG. 16 are part of the search window. The large number of pixels in the $14^{th}$ column and in the $14^{th}$ row are not included in the search window because they are too far away from the estimated center point.

The search window is utilized to find the centroid of the object. The centroid is the point whose coordinates are the averages of all of the "1" pixels within the search window. In the search window, the row number for each "1" pixel is summed. The sum is then divided by the total number of "1's" in the search window. This gives the row coordinate of the centroid. Next, the column number for each "1" pixel is added together. The sum is then divided by the total number of "1's" in the search window. This gives the column coordinate of the centroid. In the search window shown in FIG. 16, there are 22 "1" pixels. There is one pixel in the $5^{th}$ column, three pixels in the $6^{th}$ column, five pixels in the $7^{th}$ column, five pixels in the $8^{th}$ column, four pixels in the $9^{th}$ column, three pixels in the $10^{th}$ column, and one pixel in the $11^{th}$ column. The centroid in the column direction is therefore $(((1*5)+(3*6)+(5*7)+(5*8)+(4*9)+(3*10)+(1*11))/22)=7.95$. Rounded to the nearest column number, gives a column coordinate of 8, or the $8^{th}$ column.

A similar process is utilized to calculate the row coordinate of the centroid. First, the row number for each "1" pixel is added together. The sum is then divided by the total number of "1's" in the search window. This gives the row coordinate of the centroid. In the search window shown in FIG. 16, there are 22 "1" pixels. There are three pixels in the $5^{th}$ row, four pixels in the $6^{th}$ row, four pixels in the $7^{th}$ row, five pixels in the $8^{th}$ row, five pixels in the $9^{th}$ row, one pixel in the $10^{th}$ row, and no pixel in the $11^{th}$ row. The centroid in the row direction is therefore $(((3*5)+(4*6)+(4*7)+(5*8)+(5*9)+(1*10)+(0*11))/22)=7.36$. Rounded to the nearest row number, gives a row coordinate of 7, or the $7^{th}$ row.

The tracking ability of the system is further enhanced through the use of a "helper" object. The system may be preprogrammed with information concerning an additional object in the frame that is near the tracked object. For example, if a rigid object has multiple colors such as blue and red, the system can be calibrated to track the red color on the object. When the red object is tracked, after the center of the red portion is calculated, the system can be preprogrammed to search for predetermined amount of blue pixels within a predetermined distance from the center of the red object. In such an embodiment, if the helper is not initially found, the system creates another search window, once again finds the center of the red object, and again looks for the blue helper object. If the helper is not found, the process beginning with the creation of a search window may again be repeated for a set number of iterations until the helper is found. If the helper is found at any time during the iterations, then the red object is tracked. In the preferred embodiment, cross-hairs are displayed on top of the center of the tracked object when it is tracked. If the helper is not found after the set number of iterations, then the object is not tracked for that frame, because it cannot be found within the frame. While only one helper object is employed in the preferred embodiment, other embodiments may utilize more than one helper object.

Figure 17:
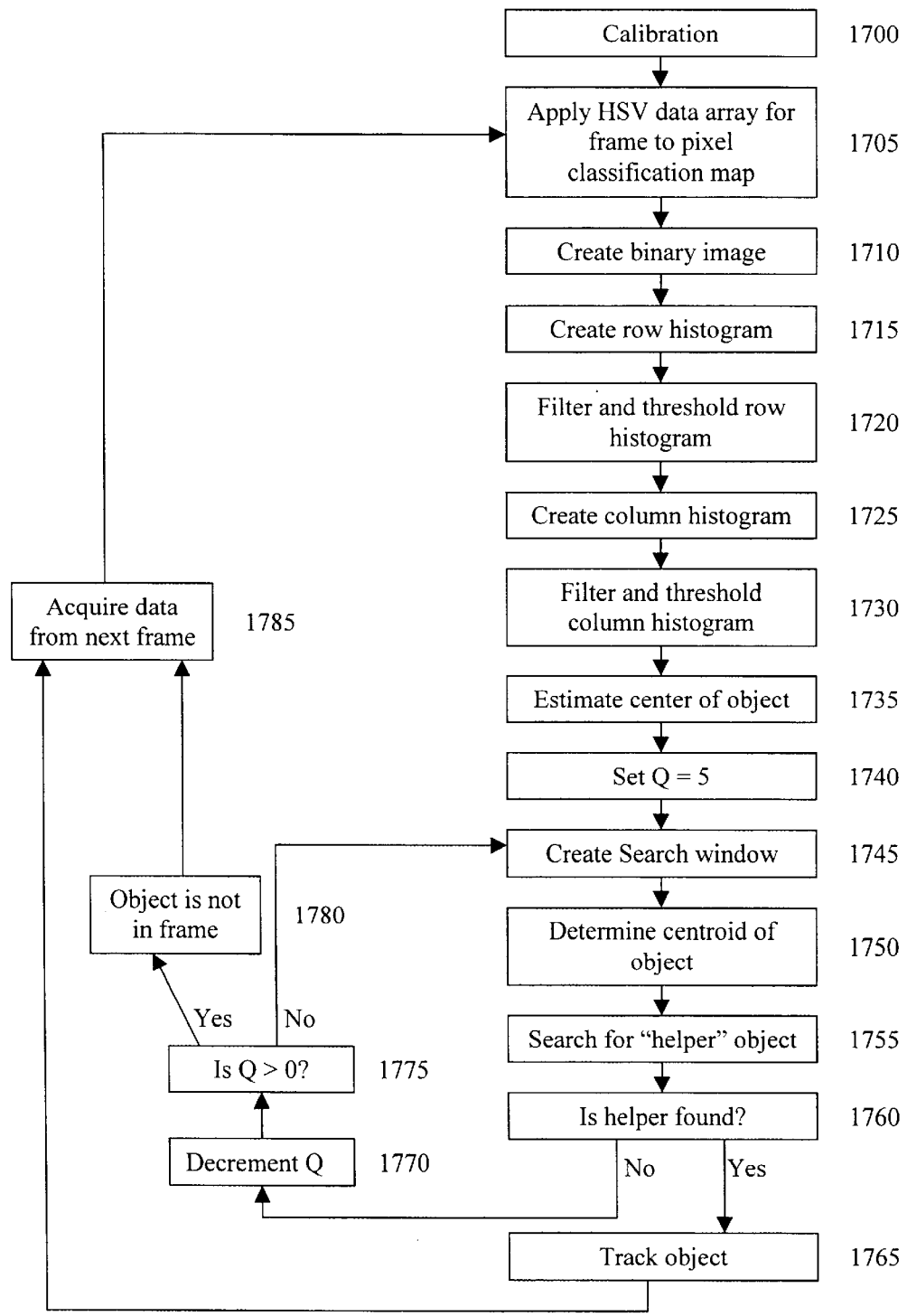
FIG. 17 illustrates a tracking process according to an embodiment of the present invention.

FIG. 17 illustrates the tracking process according to an embodiment of the present invention. First, the aforementioned calibration process 1700 is undertaken. The HSV data array for the current frame is then applied 1705 to the pixel classification map calculated during the calibration process. Next, a binary image is created 1710. A row histogram is calculated 1715. The row histogram is then filtered and thresholded 1720. A column histogram is then created 1725. The column histogram is then filtered and thresholded 1730. From the row and column histograms after the application of low-pass filters, the center of the tracked object is estimated 1735.

A counter Q is then loaded 1740 with a predetermined number. In one embodiment, the number "5" is loaded into counter Q. In other embodiments, other numbers may be loaded into counter Q. A search window is then created 1745. From the search window, the centroid of the tracked object is determined 1750. Next, the program searches for a helper object 1755. If the helper object is found 1760, the object is tracked 1765. If the helper object is not found 1760, counter Q is decremented 1770. If counter Q is greater 1775 than zero, then the process repeats, beginning with the creation 1745 of the search window. If Q is not greater 1775 than zero, the program determines 1780 that the object is not within the frame. If the object is tracked 1765 or it is determined that the object is not in the frame 1780, then data from the next frame is thereafter acquired 1785. Finally, the entire process repeats, beginning with the HSV data array for the frame being applied 1705 to the pixel classification map.

Figure 18:
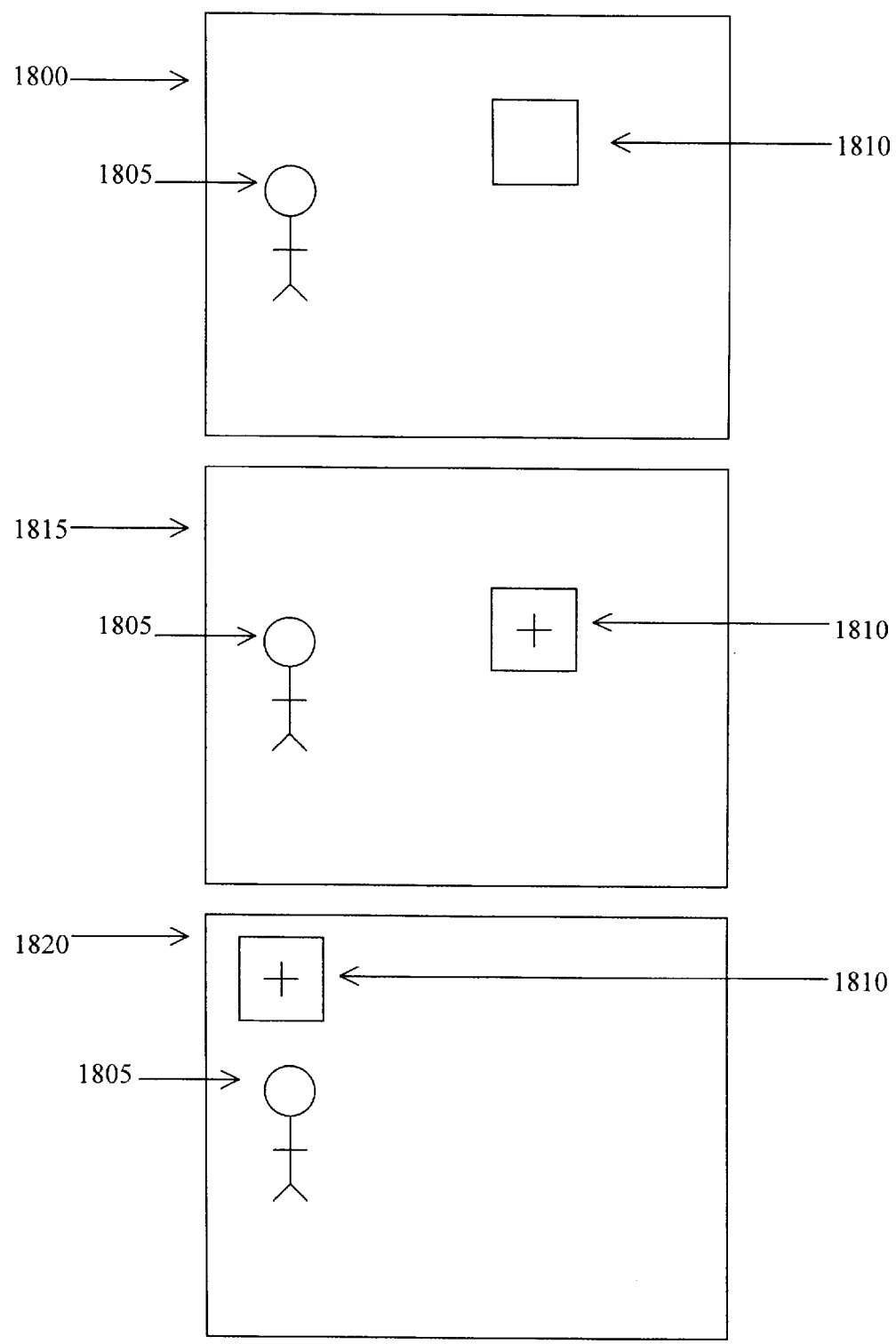
FIG. 18 illustrates an object being tracked through a series of video frames according to en embodiment of the present invention.

FIG. 18 illustrates an object being tracked through a series of video frames according to en embodiment of the present invention. The first image 1800 has a person 1805 and falling box 1810. In the next image, the person 1805 has remained stationary, but the box 1810 as moved. In this example, the box 1810 is the object being tracked. During the tracking of the box 1810, cross-hairs are superimposed on the boxes 1810 center. In the third image 1820, the person 1805 is located in the same area of the image, but the box 1810 has once again moved. Again, cross-hairs are superimposed on the center of the box 1810.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automated object tracking system for tracking a colored object through a series of frames of data, comprising:
   a first image source device to provide a data array of pixels of a digital image;
   a second image source device to provide a binary image of the data array; and
   an analysis system to create a first histogram for columns of the binary image, and a second histogram for rows of the binary image, each of the first histogram and the second histogram being thresholded and filtered to create a first thresholded filtered histogram and a second thresholded filtered histogram, wherein the filtering reduces the effect of noise and reduces the effect of pixels in the data array away from a main concentration of pixels, and after thresholding and filtering, are utilized to estimate a center of the colored object in the binary image.

2. The system of claim 1, wherein the data array includes pixels in a Hue-Saturation-Value (HSV) data array.

3. The system of claim 1, wherein every pixel in the binary image is represented by a "0" or a "1", wherein each "1" represents a pixel that is determined to have similar charcteristics to those of the colored object.

4. The system of claim 1, wherein the first input source device is a digital camera.

5. The system of claim 1, wherein a search window is created in the binary image, the search window being centered around the estimated center of the colored object.

6. The system of claim 5, wherein a centroid of the "1" pixels in the search window is determined.

7. The system of claim 6, wherein the analysis system searches for pixels having predetermined characteristics located within a predetermined distance from the centroid.

8. An automated object tracking system for tracking a colored object through a series of frames of data, comprising:
   a first image source device to provide a data array of pixels of a digital image;
   a second image source device to provide a binary image of the data array; and
   an analysis system to create a first histogram for columns of the binary image, and a second histogram for rows of the binary image, wherein each of the first histogram and the second histogram are thresholded and filtered, and after thresholding and filtering, are utilized to estimate a center of the colored object in the binary image,
   wherein a search window is created in the binary image, the search window being centered around the estimated center of the colored object, a centroid of "1" pixels ("1" representing a pixel that is determined to have similar characteristics to those of the colored object) in the search window is determined, the analysis system searches for pixels having predetermined characteristics located within a predetermined distance from the centroid, and
   if a predetermined number of pixels having predetermined characteristics are located within the predetermined distance from the centroid, the analysis system determines that the centroid is the center of the tracked object.

9. A method of automatically tracking a colored object through a series of frames of data, comprising:

providing a data array of pixels of a digital image, the digital image created by an image source;

providing a binary image of the data array; and creating a first histogram for columns of the binary image and a second histogram for rows of the binary image, thresholding and filtering the first histogram and the second histogram to create a first thresholded filtered histogram and a second thresholded filtered histogram, wherein the filtering reduces the effect of noise and reduces the effect of pixels in the data array that are away from a main concentration of pixels, and utilizing the first thresholded filtered histogram and the second thresholded filtered histogram to estimate the center of the colored object in the binary image.

10. The method of claim 9, wherein the data array includes pixels in a Hue-Saturation-Value (HSV) data array.

11. The method of claim 9, wherein every pixel in the binary image is represented by a "0" or a "1", wherein each "1" represents a pixel that is determined to have similar characteristics to those the colored object.

12. The method of claim 9, wherein the method further includes utilizing a digital camera as the image source.

13. The method of claim 9, wherein the method further includes creating a search window in the binary image, the search window being centered around the estimated center of the colored object.

14. The system of claim 13, wherein the method further includes determining a centroid of the "1" pixels in the search window.

15. The method of claim 14, wherein the method further includes searching for pixels having predetermined characteristics located within a predetermined distance from the centroid.

16. A method of automatically tracking a colored object through a series of frames of data, comprising:

providing a data array of pixels of a digital image;

providing a binary image of the data array;

creating a first histogram for columns of the binary image and a second histogram for rows of the binary image, wherein each histogram is thresholded and filtered, and after thresholding and filtering, are utilized to estimate the center of the colored object in the binary image;

creating a search window in the binary image, the search window being centered around the estimated center of the colored object;

determining a centroid of "1" pixels ("1" representing a pixel that is determined to have similar characteristics to those of the colored object) in the search window;

searching for pixels having predetermined characteristics located within a predetermined distance from the centroid; and determining that the centroid is the center of the tracked object if a predetermined number of pixels having predetermined pixels are located within the predetermined distance from the centroid.

17. A method of automatically tracking a colored object through a series of frames of data, comprising:

providing a data array of pixels of a digital image;

creating a binary image from the data array of pixels by comparing each pixel in the data array of pixels to a pixel classification map wherein a first value represents that a pixel corresponds to an object in the pixel classification map and a second value represents that a pixel does not correspond to an object in the pixel classification map;

creating a first histogram for columns of the binary image and creating a second histogram for rows of the binary image;

filtering at least one of the first histogram and the second histogram to create a filtered first histogram and a filtered second histogram to reduce the effect of a remote column or remote row having a large number of pixels which have the first value that are away from a main concentration of pixels having the first value;

thresholding the filtered first histogram and the filtered second histogram to create a thresholded filtered first histogram and a thresholded filtered second histogram to erase columns and rows below a specified threshold level; and utilizing the filtered thresholded first histogram and the filtered thresholded second histogram to estimate the center of the colored object in the binary image.

18. The method of claim 17, wherein filtering at least one of the first histogram or the second histogram to reduce the effect of a remote column or remote row having a large amount of pixels which have the first value that are away from a main concentration of pixels having the first value, includes analyzing a number of proximate columns or proximate rows in close proximity to the remote columns or remote rows.

19. The method of claim 18, further including as part of the filtering, calculating a new value of a number of pixels having the first value for the remote column or the remote row by adding a weighted value of the large amount of pixels of the remote column or the remote row to weighted values of a number of pixels in the number of proximate columns or proximate rows.

20. The method of claim 17, further including determining a center column in the filtered thresholded first histogram and a center row in the filtered thresholded second histogram, and creating a search window in the binary image, wherein the search window utilizes the center column and the center row as a search window center point.

21. The method of claim 20, wherein a number of columns in the search window is equal a number of pixels having the first value in the center column and a number of rows in the search window is equal to a number of pixels having the first value in the center row.

22. The method of claim 20, further including determining a centroid of the first value pixels in the search window.

23. The method of claim 22, further including searching for pixels having predetermined characteristics located within a predetermined distance from the centroid.

24. The method of claim 23, further including determining the centroid is the center of the tracked object if a predetermined number of pixels having predetermined characteristics are located within the predetermined distance from the centroid.

* * * * *